(12) United States Patent
Cho et al.

(10) Patent No.: US 9,318,065 B2
(45) Date of Patent: Apr. 19, 2016

(54) DISPLAY PANEL AND METHOD OF MANUFACTURING THE SAME

(71) Applicant: Samsung Display Co., LTD., Yongin, Gyeonggi-Do (KR)

(72) Inventors: Se-Hyoung Cho, Hwaseong-si (KR); Il-Gon Kim, Seoul (KR); Mee-Hye Jung, Suwon-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/833,381

(22) Filed: Aug. 24, 2015

(65) Prior Publication Data

US 2015/0364101 A1  Dec. 17, 2015

Related U.S. Application Data

(63) Continuation of application No. 14/142,401, filed on Dec. 27, 2013, now Pat. No. 9,146,435.

(30) Foreign Application Priority Data

Aug. 7, 2013 (KR) .................. 10-2013-0093570

(51) Int. Cl.
  *G02F 1/136* (2006.01)
  *G09G 3/36* (2006.01)
  *G02F 1/1362* (2006.01)

(52) U.S. Cl.
  CPC .......... *G09G 3/3648* (2013.01); *G02F 1/13624* (2013.01); *G09G 2300/0426* (2013.01); *G09G 2300/0465* (2013.01)

(58) Field of Classification Search
  CPC .......................... G02F 1/13624; G09G 3/3648
  See application file for complete search history.

(56) References Cited

U.S. PATENT DOCUMENTS

| | | | |
|---|---|---|---|
| 6,839,118 B2 | 1/2005 | Nagaoka | |
| 7,349,051 B2 | 3/2008 | Kim et al. | |
| 7,391,490 B2 | 6/2008 | Nakanishi et al. | |
| 7,701,520 B2 | 4/2010 | Ohashi et al. | |
| 8,107,027 B2 | 1/2012 | Kim | |
| 8,319,921 B2 | 11/2012 | Saitoh et al. | |
| 2010/0118221 A1 | 5/2010 | Kim et al. | |
| 2010/0157186 A1 | 6/2010 | Kim et al. | |
| 2011/0006975 A1 | 1/2011 | Nagashima et al. | |

*Primary Examiner* — Phu Vu
(74) *Attorney, Agent, or Firm* — Cantor Colburn LLP

(57) ABSTRACT

A display panel includes a high pixel electrode including a first stem which extends substantially in a first direction, and a second stem which extends substantially in a second direction crossing the first direction, a low pixel electrode including a first stem which extends substantially in the first direction, and a second stem which extends substantially in the second direction, a data line which extends in the second direction, a high storage line which extends substantially in the second direction and overlaps the second stem of the high pixel electrode, and a low storage line which extends substantially in the second direction and overlaps the second stem of the low pixel electrode.

10 Claims, 20 Drawing Sheets

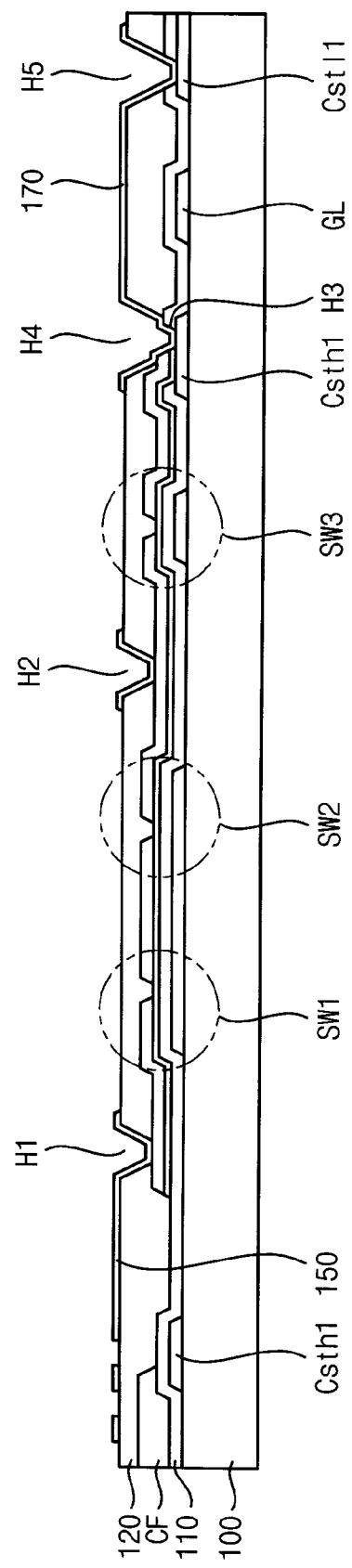

DISPLAY PANEL AND METHOD OF MANUFACTURING THE SAME

This application claims priority to Korean Patent Application No. 10-2013-0093570, filed on Aug. 7, 2013, and U.S. patent application Ser. No. 14/142,401, filed on Dec. 27, 2013, and all the benefits accruing therefrom under 35 U.S.C. §119, the contents of which are incorporated by reference herein in its entirety.

BACKGROUND

1. Field

Exemplary embodiments of the invention relate to a display panel and a method of manufacturing the display panel.

More particularly, exemplary embodiments of the present invention relate to a display panel of a liquid crystal display apparatus and a method of manufacturing the display panel.

2. Description of the Related Art

Recently, a liquid display apparatus having light weight and small size has been manufactured. A cathode ray tube ("CRT") display apparatus has been used due to a performance and a competitive price. However the CRT display apparatus has a weakness with a size or portability. Therefore, the liquid display apparatus has been widely used due to small size, light weight and low-power-consumption thereof.

The liquid crystal display apparatus may include pixels having various structures according to a driving method. The structure of the pixels has been various studied to improve an aperture ratio and a transmittance.

SUMMARY

One or more exemplary embodiment of the invention provides a display panel with improved aperture ratio and transmittance.

One or more exemplary embodiments of the invention also provide a method of manufacturing the display panel.

According to an exemplary embodiment of the invention, a display panel includes a first gate line which extends in a first direction, a first data line which extends substantially in a second direction, which is substantially perpendicular to the first direction, a second data line spaced apart from the first data line in the first direction and which extends substantially in the second direction, a high pixel electrode disposed between the first data line and the second data line and disposed adjacent to the first gate line, a low pixel electrode disposed between the first data line and the second data line and disposed opposite to the high pixel electrode with reference to the first gate line, a high storage line which extends substantially in the second direction and overlaps the high pixel electrode, and a low storage line which extends substantially in the second direction and overlaps the low pixel electrode.

In an exemplary embodiment, the display panel may further include a first switching element electrically connected to the first gate line, the first data line and the high pixel electrode, a second switching element electrically connected to the first gate line, the first data line and the low pixel electrode, and a third switching element electrically connected to the first gate line, the second switching element and the high storage line.

In an exemplary embodiment, the high storage line may include a first high storage line which extends substantially in the first direction and a second high storage line which extends substantially in the second direction. The low storage line may include a first low storage line which extends substantially in the first direction and a second low storage line which extends substantially in the second direction.

In an exemplary embodiment, the high pixel electrode may include a first stem which extends substantially in the first direction, a second stem which extends substantially in the second direction, and a plurality of branches which extends from the first and second stems, where the high pixel electrode may have a slit structure defined by the branches. In such an embodiment, the low pixel electrode may include a first stem which extends substantially in the first direction, a second stem which extends substantially in the second direction, and a plurality of branches which extends from the first and second stems, where the low pixel electrode may have a slit structure defined by the branches. In such an embodiment, the second high storage line may overlap the second stem of the high pixel electrode, and the second low storage line may overlap the second stem of the low pixel electrode.

In an exemplary embodiment, the first high storage line may be disposed between the first data line and the second data line, and may not overlap the first data line and the second data line. In such an embodiment, the low storage line may be disposed between the first data line and the second data line, and may not overlap the first data line and the second data line.

In an exemplary embodiment, the display panel may further include a connecting electrode which electrically connects the high storage line to the low storage line.

In an exemplary embodiment, the display panel may further include a common electrode disposed opposite to the high pixel electrode and the low pixel electrode, and a liquid crystal layer disposed between the high and low pixel electrodes and the common electrode.

In an exemplary embodiment, the display panel may further include a second gate line connected to a pixel adjacent to a pixel connected to the first gate line in the second direction, where the second data line is electrically connected to the pixel connected to the second gate line.

In an exemplary embodiment, a same gate signal may be applied to the first gate electrode and the second gate electrode.

In an exemplary embodiment, a side portion of the high pixel electrode may overlap the first and second data lines, and a side portion of the low pixel electrode may overlap the first and second data lines.

In an exemplary embodiment, the high storage line, the low storage line and the first gate line may be disposed in a same layer as each other.

In an exemplary embodiment, the display panel may further include a first driving part disposed at a side portion of the display panel, and a storage compensating line electrically connected to the first driving part, electrically connected to the high and low storage lines, and disposed along a side portion of the display panel.

In an exemplary embodiment, the storage compensating line may include a first portion disposed opposite to the first driving part and which extends in the first direction, and a second portion connecting the first portion to the first driving part and which extends in the second direction.

According to another exemplary embodiment of the invention, a method of manufacturing a display panel includes providing a gate pattern comprising a gate line, a high storage line and a low storage line on a substrate; providing a first insulation layer on the substrate on which the gate pattern is formed; providing a data pattern comprising a first data line and a second data line on the first insulation layer; providing a second insulation layer on the first insulation layer on which the data pattern is formed; and providing a high pixel electrode, a low pixel electrode and a connecting electrode, which connects the high storage line and the low storage line, on the second insulation layer.

In an exemplary embodiment, the gate line may extend substantially in a first direction. In such an embodiment, the first data line may extend substantially in a second direction, which is substantially perpendicular to the first direction. In such an embodiment, the second data line may be spaced apart from the first data line in the first direction, and may extend substantially in the second direction. In such an embodiment, the high pixel electrode may be disposed between the first data line and the second data line and disposed adjacent to the gate line. In such an embodiment, the low pixel electrode may be disposed between the first data line and the second data line and disposed opposite to the high pixel electrode with reference to the gate line. In such an embodiment, the high storage line may extend substantially in the second direction, and may overlap the high pixel electrode. In such an embodiment, the low storage line may extend substantially in the second direction, and overlap the low pixel electrode.

In an exemplary embodiment, the method may further include: providing a first switching element, which is electrically connected to the gate line, the first data line and the high pixel electrode; providing a second switching element, which is electrically connected to the gate line, the first data line and the low pixel electrode; and providing a third switching element, which is electrically connected to the gate line, the second switching element and the high storage line.

In an exemplary embodiment, the high storage line may include a first high storage line which extends substantially in the first direction and a second high storage line which extends substantially in the second direction. The low storage line may include a first low storage line which extends substantially in the first direction and a second low storage line which extends substantially in the second direction.

In an exemplary embodiment, the method may further include providing a color filter on the first insulation layer, on which the data pattern is provided, before the providing the second insulation layer.

In an exemplary embodiment, the method may further include forming a first contact hole through the first insulation layer to expose the high storage line before the providing the data pattern. In such an embodiment, the high storage line may be connected to a third source electrode of the third switching element through the first contact hole.

In an exemplary embodiment, the method may further include forming a second contact hole through the second insulation layer to expose the third source electrode of the third switching element and a third contact hole through the second and first insulation layer to expose the low storage line before the providing the connecting electrode. In such an embodiment, the connecting electrode may be electrically connected to the high storage line and the third source electrode of the third switching through the first and second contact hole, and may be electrically connected to the low storage line through the third contact hole.

According to exemplary embodiment of the invention, a display panel includes a high storage line overlapping second stems of high and low pixel electrode, such that an aperture ratio and display quality at a boundary of pixels may be improved.

In such embodiments, the high and low storage lines do not overlaps first and second data lines, such that the display quality may be improved by preventing a coupling capacitor at the boundary of the pixels.

In such embodiments, the high and low pixel electrodes overlap the first and second data lines, such that the aperture ratio may be improved.

In such embodiments, the display panel includes a storage compensating line disposed at side portions or a peripheral area of the display panel, such that a storage voltage may be stably provided.

BRIEF DESCRIPTION OF THE DRAWINGS

The above and other features of the invention will become more apparent by describing in detail exemplary embodiments thereof with reference to the accompanying drawings, in which.

DETAILED DESCRIPTION

Figure 1:
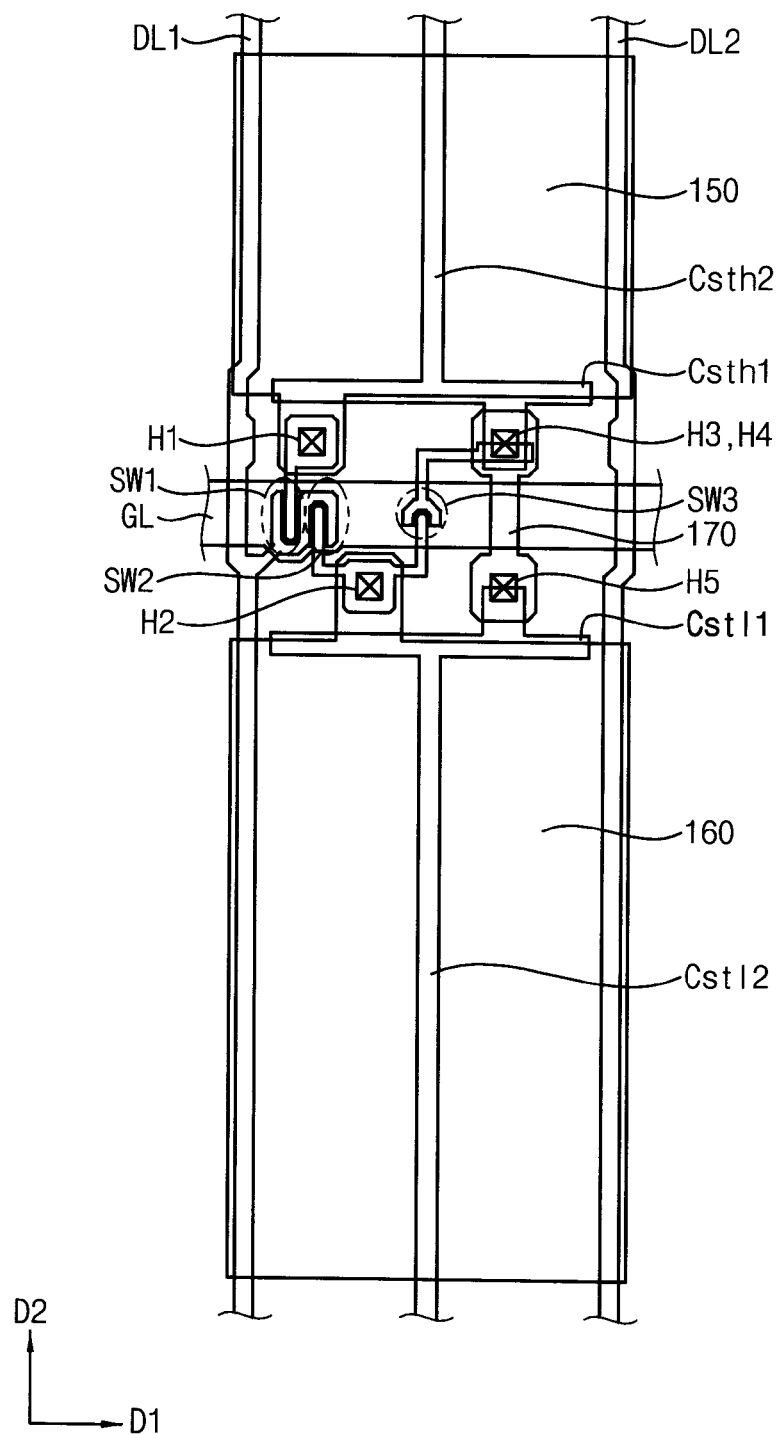
FIG. 1 is a plan view illustrating a pixel of an exemplary embodiment of a display panel, according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in detail with reference to the accompanying drawings.

Figure 2:
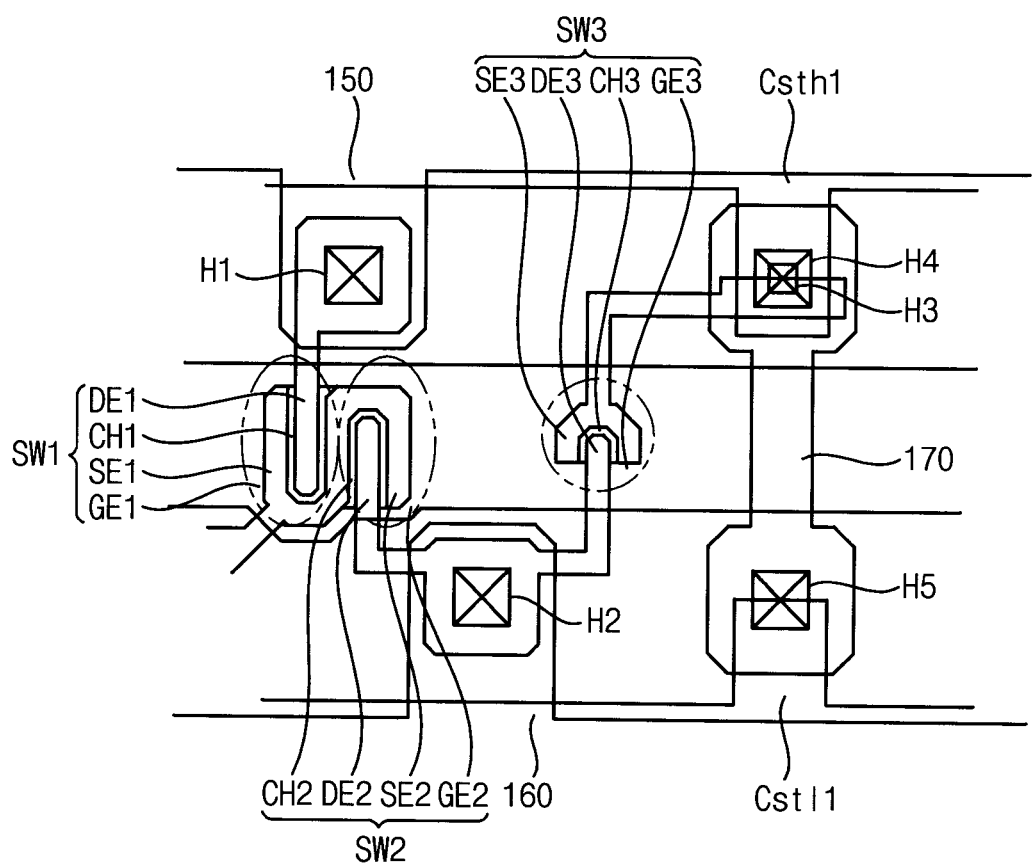
FIG. 2 is a partially enlarged view of a switching element of FIG. 1.

FIG. 1 is a plan view illustrating a pixel of an exemplary embodiment of a display panel, according to the invention. FIG. 2 is a partially enlarged view illustrating a switching element of FIG. 1. In an exemplary embodiment, the display panel may include a plurality of pixels. Hereinafter, one pixel, which is illustrated in FIGS. 1 and 2, will be described for convenience of description.

Referring to FIGS. 1 and 2, an exemplary embodiment of a display panel includes a gate line GL, a first data line DL1, a second data line DL2, a first high storage line Csth1, a second high storage line Csth2, a first low storage line Cstl1, a second low storage line Cstl2, a first switching element SW1, a second switching element SW2, a third switching element SW3, a high pixel electrode 150, a low pixel electrode 160 and a connecting electrode 170.

The gate line GL extends substantially in a first direction D1. The gate line GL is electrically connected to a first gate electrode GE1 of the first switching element SW1, a second gate electrode GE2 of the second switching element SW2, and a third gate electrode GE3 of the third switching element SW3. In an exemplary embodiment, portions of the gate line GL may define the first gate electrode GE1, the second gate electrode GE2 and the third gate electrode GE3.

The first data line DL1 extends substantially in a second direction D2, which may be substantially perpendicular to the first direction D1, and crosses the gate line GL. The first data line DL1 is electrically connected to a first source electrode SE1 of the first switching element SW1, and a second source electrode SE2 of the second switching element SW2.

The second data line DL2 is spaced apart from the first data line DL1, extends substantially in the second direction D2, and crosses the gate line GL. The second data line DL2 is electrically connected to a first source electrode of a first switching element of an adjacent pixel, and a second source electrode of the second switching element of the adjacent pixel (referred to as FIG. 15).

The high pixel electrode 150 is disposed adjacent to the gate line GL in the second direction D2, and between the first data line DL1 and the second data line DL2. The high pixel electrode 150 is electrically connected to a first drain electrode DE1 of the first switching element SW1 through a first contact hole H1. A side portion of the high pixel electrode 150 may overlap the first data line DL1 and the second data line DL2.

The low pixel electrode 160 is disposed opposite to the high pixel electrode 150 with reference to the gate line GL, and between the first data line DL1 and the second data line DL2. The low pixel electrode 160 is electrically connected to a second drain electrode DE2 of the second switching element SW2 through a second contact hole H2. A side portion of the low pixel electrode 160 may overlap the first data line DL1 and the second data line DL2.

A first voltage may be applied to the high pixel electrode 150. A second voltage, which is different from the first voltage, may be applied to the low pixel electrode 160. In one exemplary embodiment, for example, the first voltage may be higher than the second voltage, a portion of the pixel corresponding to the high pixel electrode 150 may be driven as a high pixel, and another portion of the pixel corresponding to the low pixel electrode 160 may be driven as a low pixel.

The first high storage line Csth1 extends substantially in the first direction D1, and is disposed adjacent to the gate line GL. The first high storage line Csth1 is disposed between the first data line DL1 and the second data line DL2, and does not overlap the first and second data lines DL1 and DL2. The first high storage line Csth1 may overlap a side portion of the high pixel electrode 150. The first high storage line Csth1 is electrically connected to a third source electrode SE3 of the third switching element SW3 though a third contact hole H3. The first high storage line Csth1 is electrically connected to the connecting electrode 170 through a fourth contact hole H4.

In such an embodiment, the second high storage line Csth2 is disposed between the first data line DL1 and the second data line DL2, and extends substantially in the second direction D2. The second high storage line Csth2 overlaps the high pixel electrode 150. The second high storage line Csth2 is electrically connected to the first high storage line Csth1, e.g., a middle portion of the first high storage line Csth1. In an exemplary embodiment, the second high storage line Csth2 is disposed in the middle of the high pixel electrode 150, such that the second high storage line Csth2 divides the high pixel electrode 150 into two portions.

The first low storage line Cstl1 is disposed adjacent to the gate line GL, and opposite to the first high storage line Csth1 with reference to the gate line GL. The first low storage line Cstl1 extends substantially in the first direction D1. The first low storage line Cstl1 is disposed between the first data line DL1 and the second data line DL2, and does not overlap the first and second data lines DL1 and DL2. The first low storage line Cstl1 may overlap a side portion of the low pixel electrode 160. The first low storage line Cstl1 is electrically connected to the connecting electrode 170 through a fifth contact hole H5.

In such an embodiment, the second low storage line Cstl2 is disposed between the first data line DL1 and the second data line DL2, and extends substantially in the second direction D2. The second low storage line Cstl2 overlaps the low pixel electrode 160. The second low storage line Cstl2 is electrically connected to the first low storage line Cstl1, e.g., a middle portion of the first low storage line Cstl1. The second low storage line Cstl2 is disposed in a middle of the low pixel electrode 160, such that the second low storage line Cstl2 divides the low pixel electrode 160 into two portions.

The second high storage line Csth2 is electrically connected to a second low storage line of an adjacent pixel in the second direction D2. In such an embodiment, the second low storage line Cstl2 is electrically connected to a second high storage line of an adjacent pixel in the second direction D2. Thus, in such an embodiment of the display panel, second high storage lines and second low storage lines are connected to each other along the second direction D2 (referred to as Cst of FIG. 17).

In an exemplary embodiment, as shown in FIG. 2, the first switching element SW1 includes the first gate electrode GE1, the first source electrode SE1, the first drain electrode DE1 and a first channel portion CH1 that connects the first source electrode SE1 to the first drain electrode DE1.

The first channel portion CH1 may include a semiconductor layer including amorphous silicon ("a-Si:H") and an ohmic contact layer including n+ amorphous silicon ("n+ a-Si:H"). In an exemplary embodiment, the first channel portion CH1 may include an oxide semiconductor. The oxide semiconductor may include an amorphous oxide including indium (In), zinc (Zn), gallium (Ga), tin (Sn), hafnium (Hf) or a combination thereof.

The second switching element SW2 includes the second gate electrode GE2, the second source electrode SE2, the second drain electrode DE2 and a second channel portion CH2 that connects the second source electrode SE2 to the second drain electrode DE2.

The second channel portion CH2 may be substantially the same as the first channel portion CH1.

The third switching element SW3 includes the third gate electrode GE3, the third source electrode SE3, the third drain electrode DE3 and a third channel portion CH3 that connects the third source electrode SE3 to the third drain electrode DE3.

The third channel portion CH3 may be substantially the same as the first and second channel portions CH1 and CH2.

The connecting electrode 170 is electrically connected to the third source electrode SE3 of the third switching element SW3 and the first high storage line Csth1 through the third contact hole H3 and the fourth contact hole H4. In an exemplary embodiment, the connecting electrode 170 extends substantially in the second direction D2, and electrically connected to the first low storage line Cstl1 through the fifth contact hole H5.

Figure 3:
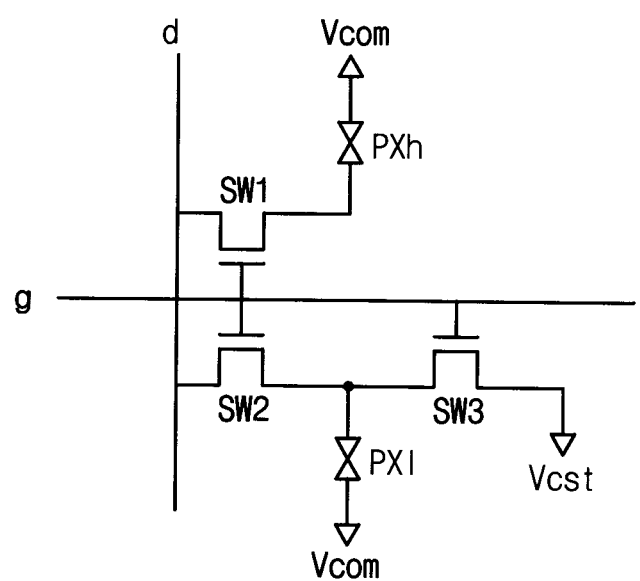
FIG. 3 is an equivalent circuit diagram of the pixel of FIG. 1.

FIG. 3 is an equivalent circuit diagram of the pixel of FIG. 1.

Referring to FIG. 3, a pixel of an exemplary embodiment of a display panel includes a first data line that receives a first data signal d1, a gate line that receives a gate signal g, a first switching element SW1, a second switching element SW2, a third switching element SW3, a high pixel liquid crystal capacitor PXh and a low pixel liquid crystal capacitor PXl.

A source electrode of the first switching element SW1 is connected to the first data line. A gate electrode of the first switching element SW1 is connected to the gate line. A drain electrode of the first switching element SW1 is connected to the high pixel liquid crystal capacitor PXh. The high pixel liquid crystal capacitor PXh is formed by a high pixel electrode (referred to as 150 of FIG. 1), a common electrode (referred to as 210 of FIG. 6) to which a common voltage Vcom is applied, and a liquid crystal layer (referred to as 3 of FIG. 6).

A source electrode of the second switching element SW2 is connected to the first data line. A gate electrode of the second switching element SW2 is connected to the gate line. A drain electrode of the second switching element SW2 is connected to a drain electrode of the third switching element SW3 and the low pixel liquid crystal capacitor PXl. The low pixel liquid crystal capacitor PXl is formed by a low pixel electrode (refers 160 of FIG. 1), a common electrode (referred to as 210 of FIG. 6) to which a common voltage Vcom is applied, and a liquid crystal layer (referred to as 3 of FIG. 6).

A storage voltage Vcst is applied to a source electrode of the third switching electrode SW3. The storage voltage Vcst is applied to first and second high storage lines (referred to as Csth1 and Csth2 of FIG. 1, respectively) and is applied first and second low storage lines (referred to as Cstl1 and Cstl2 of FIG. 1, respectively). The first high storage line is connected to the source electrode of the third switching element SW3.

In an exemplary embodiment, although not shown in the figures, the high pixel electrode and the first and second high storage lines may form a high storage capacitor, and the low pixel electrode and the first and second low storage lines form a low storage capacitor.

Figure 4:
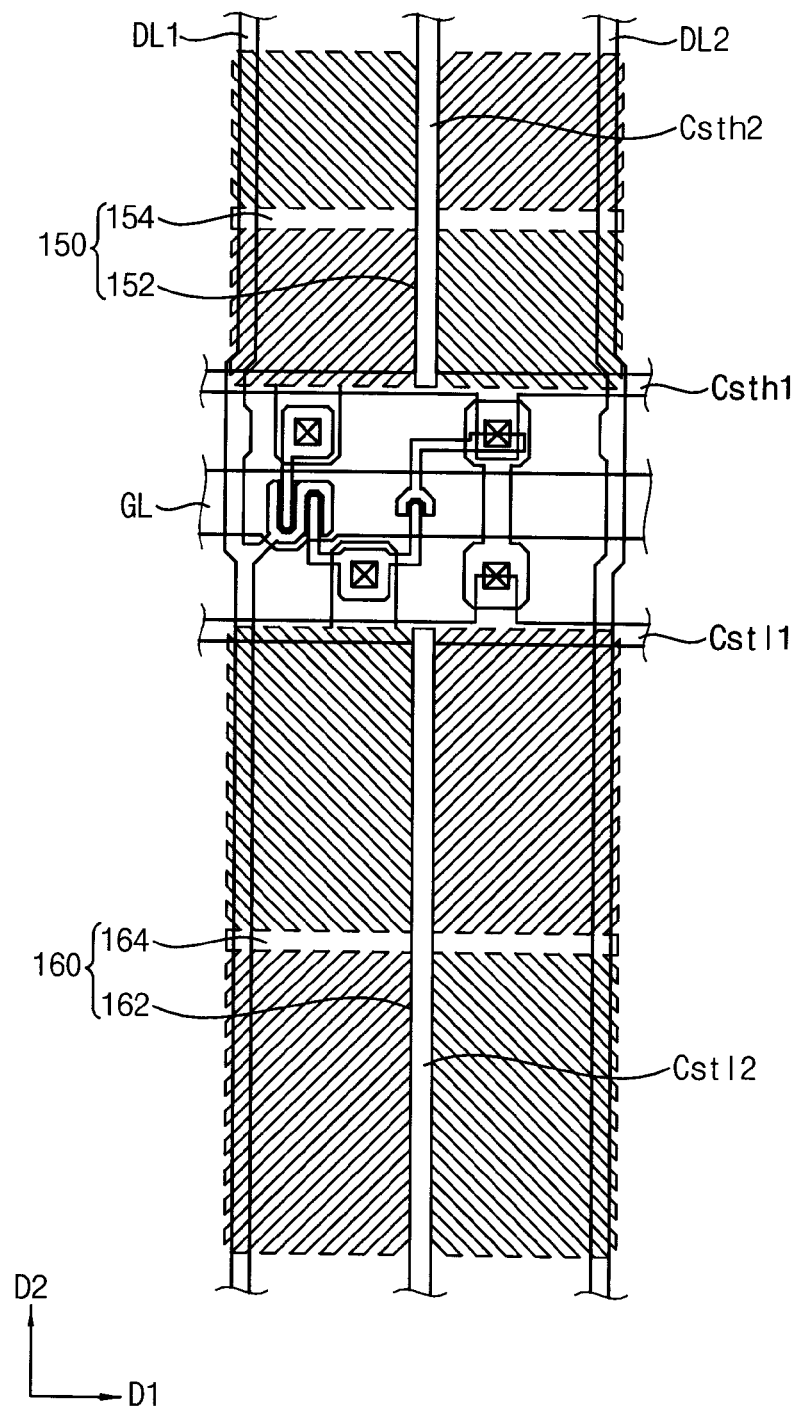
FIG. 4 is a plan view illustrating a pixel of an alternative exemplary embodiment of a display panel, according to the invention.

FIG. 4 is a plan view illustrating a pixel of an alternative exemplary embodiment of a display panel, according to the invention.

The display panel shown in FIG. 4 is substantially the same as a display panel of FIG. 1 except for a first high storage line Csth1 and a first low storage line Cstl1, a high pixel electrode 150 and a low pixel electrode 160. The same or like elements shown in FIG. 4 have been labeled with the same reference characters as used above to describe the exemplary embodiments of the display panel shown in FIG. 1, and any repetitive detailed description thereof will hereinafter be omitted or simplified.

As shown in FIG. 4, an exemplary embodiment of the display panel includes a gate line GL, a first data line DL1, a second data line DL2, a first high storage line Csth1, a second high storage line Csth2, a first low storage line Cstl1, a second low storage line Cstl2, a high pixel electrode 150 and a low pixel electrode 160.

The gate line GL extends substantially in a first direction D1. The first data line DL1 extends substantially in a second direction D2, which is substantially perpendicular to the first direction D1, and crosses the gate line GL. The second data line DL2 is spaced apart from the first data line DL1, and extends substantially in the second direction D2, and crosses the gate line GL.

The high pixel electrode 150 is disposed adjacent to the gate line GL in the second direction D2. A side portion of the high pixel electrode 150 may overlap the first data line DL1 and the second data line DL2.

The high pixel electrode 150 includes a first stem 152 that extends substantially in the second direction D2, and a second stem 154 that extends substantially in the first direction D1 and crosses the first stem 152. The first and second stems 152 and 154 may divide the high pixel electrode 150 into four domains. In one exemplary embodiment, for example, the first and second stems 152 and 154 passes a center portion of the high pixel electrode 150, and divides the high pixel electrode 150 into four domains, each of which has substantially a same area as each other.

In such an embodiment, a plurality of branches that extends from the first or second stems 152 or 154 is disposed in each of the domains. The branches may define a plurality of slits. The branches may extend in different directions in each of the four domains. Each of the slits may have an open end at boundaries of the high pixel electrode 150.

The low pixel electrode 160 is disposed opposite to the high pixel electrode 150 with reference to the gate line GL. A side portion of the low pixel electrode 160 may overlap the first data line DL1 and the second data line DL2.

The low pixel electrode 160 includes a first stem 162 that extends substantially in the second direction D2, and a second stem 164 that extends substantially in the first direction D1 and crosses the first stem 162. The first and second stems 162 and 164 may divide the low pixel electrode 160 into four domains. In one exemplary embodiment, for example, the first and second stems 162 and 164 passes a center portion of the low pixel electrode 160, and divides the low pixel electrode 160 into four domains, each of which has substantially a same area as each other.

In an exemplary embodiment, a plurality of branches that extends from the first or second stems 162 or 164 is disposed in each of the domains. The branches define a plurality of slits. The branches may extend in different directions in each of the four domains. The slits may have an open end at boundaries of the low pixel electrode 160.

The first high storage line Csth1 extends substantially in the first direction D1, and is disposed adjacent to the gate line GL. The first high storage line Csth1 is connected to a first high storage line of an adjacent pixel. Thus, the first high storage line Csth1 overlaps the first and second data lines DL1 and DL2.

The second high storage line Csth2 is disposed between the first data line DL1 and the second data line DL2, and extends substantially in the second direction D2. The second high storage line Csth2 overlaps the high pixel electrode 150. The second high storage line Csth2 is connected to the first high storage line Csth1.

The second high storage line Csth2 overlaps the first stem 152 of the high pixel electrode 150.

The first low storage line Cstl1 is disposed adjacent to the gate line GL, and opposite to the first high storage line Csth1 with reference to the gate line GL. The first low storage line Cstl1 extends substantially in the first direction D1. The first low storage line Cstl1 is connected to a first low storage line of an adjacent pixel. Thus, the first low storage line Cstl1 overlaps the first and second data lines DL1 and DL2.

The second low storage line Cstl2 is disposed between the first data line DL1 and the second data line DL2, and extend in the second direction D2. The second low storage line Cstl2 overlaps the low pixel electrode 160. The second low storage line Cstl2 is connected to the first low storage line Cstl1.

The second low storage line Cstl2 overlaps the first stem 162 of the low pixel electrode 160.

Figure 5:
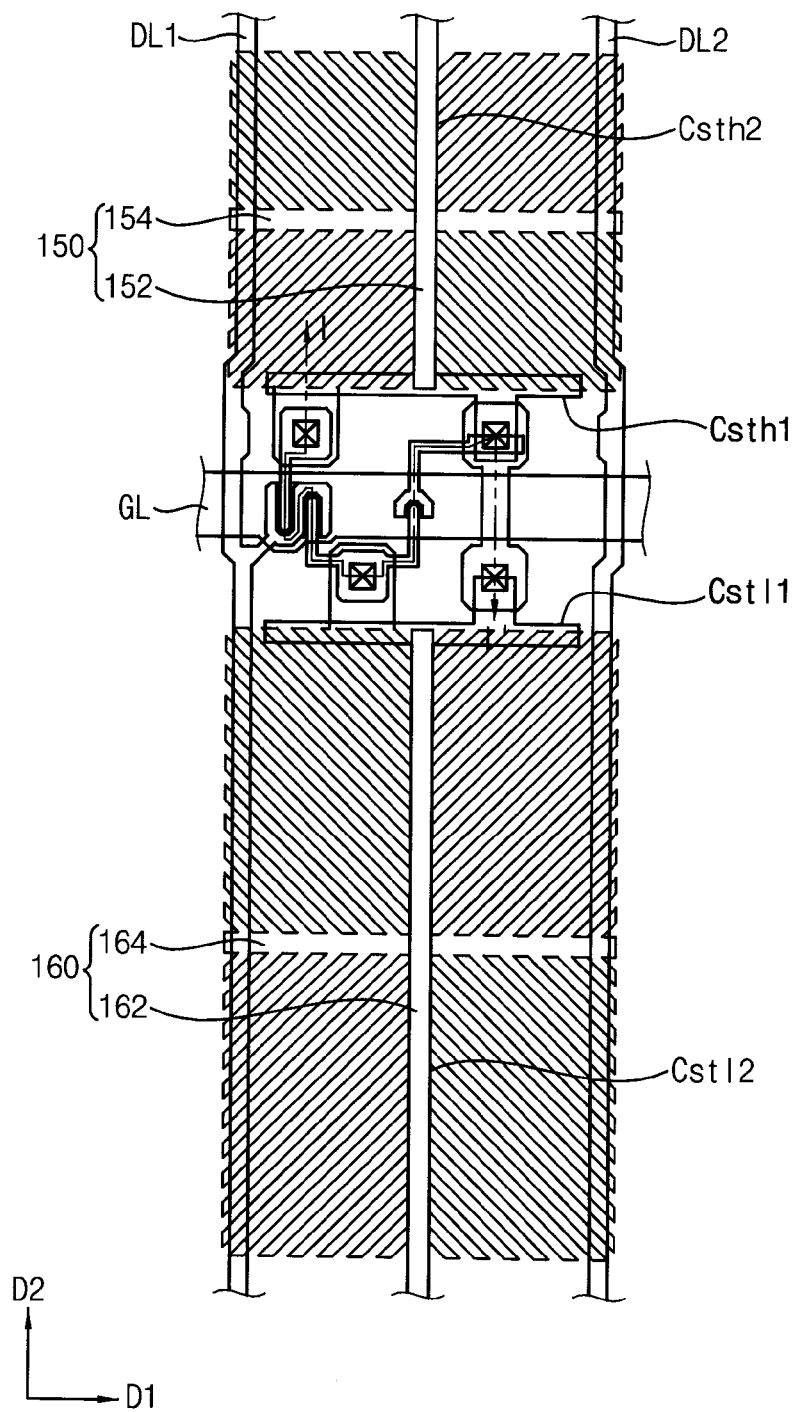
FIG. 5 is a plan view illustrating a pixel of another alternative exemplary embodiment of a display panel, according to the invention.

FIG. 5 is a plan view illustrating a pixel of another alternative exemplary embodiment of a display panel, according to the invention.

The display panel shown in FIG. 5 is substantially the same as a display panel of FIG. 1 except for a first high storage line Csth1 and a first low storage line Cstl1, a high pixel electrode 150 and a low pixel electrode 160. In such an embodiment, the high pixel electrode 150 and the low pixel electrode 160 shown in FIG. 5 are substantially the same as a high pixel electrode and a low pixel electrode of a display panel of FIG. 4. The same or like elements shown in FIG. 5 have been labeled with the same reference characters as used above to describe the exemplary embodiments of the display panel shown in FIGS. 1 and 4, and any repetitive detailed description thereof will hereinafter be omitted or simplified.

As shown in FIG. 5, an exemplary embodiment of the display panel includes a gate line GL, a first data line DL1, a second data line DL2, a first high storage line Csth1, a second high storage line Csth2, a first low storage line Cstl1, a second low storage line Cstl2, a high pixel electrode 150 and a low pixel electrode 160.

The gate line GL extends substantially in a first direction D1. The first data line DL1 extends substantially in a second direction D2, which is substantially perpendicular to the first direction D1, and crosses the gate line GL. The second data line DL2 is spaced apart from the first data line DL1, and extends substantially in the second direction D2, and crosses the gate line GL.

The high pixel electrode 150 is disposed adjacent to the gate line GL in the second direction D2. A side portion of the high pixel electrode 150 may overlap the first data line DL1 and the second data line DL2.

The high pixel electrode 150 includes a first stem 152 that extends substantially in the second direction D2, and a second stem 154 that extends substantially in the first direction D1 and crosses the first stem 152. The first and second stems 152 and 154 may divide the high pixel electrode 150 into four domains.

In such an embodiment, a plurality of branches that extends from the first or second stems 152 or 154 is disposed in each of the domains. The branches define a plurality of slits. The branches may be formed having different directions in each of the four domains. The slits may be opened at boundaries of the high pixel electrode 150.

The low pixel electrode 160 is disposed opposite to the high pixel electrode 150 with reference to the gate line GL. A side portion of the low pixel electrode 160 may overlap the first data line DL1 and the second data line DL2.

The low pixel electrode 160 includes a first stem 162 that extends substantially in the second direction D2, and a second stem 164 that extends substantially in the first direction D1 and crosses the first stem 162. The first and second stems 162 and 164 may divide the low pixel electrode 160 into four domains.

In such an embodiment, a plurality of branches that extends from the first or second stems 162 or 164 is disposed in each of the domains. The branches define a plurality of slits. The branches may be formed having different directions in each of the four domains. Each of the slits may have an open end at boundaries of the low pixel electrode 160.

The first high storage line Csth1 extends substantially in the first direction D1, and is disposed adjacent to the gate line GL. In an exemplary embodiment, as shown in FIG. 5, the first high storage line Csth1 is disposed between the first data line DL1 and the second data line DL2, and does not overlap the first and second data lines DL1 and DL2. The first high storage line Csth1 may overlap a side portion of the high pixel electrode 150.

The second high storage line Csth2 is disposed between the first data line DL1 and the second data line DL2, and extends substantially in the second direction D2. The second high storage line Csth2 overlaps the high pixel electrode 150. The second high storage line Csth2 is connected to the first high storage line Csth1.

The second high storage line Csth2 overlaps the first stem 152 of the high pixel electrode 150.

The first low storage line Cstl1 is disposed adjacent to the gate line GL, and opposite to the first high storage line Csth1 with reference to the gate line GL. The first low storage line Cstl1 extends substantially in the first direction D1. In an exemplary embodiment, as shown in FIG. 5, the first low storage line Cstl1 is disposed between the first data line DL1 and the second data line DL2, and does not overlap the first and second data lines DL1 and DL2. The first low storage line Cstl1 may overlap a side portion of the low pixel electrode 160.

The second low storage line Cstl2 is disposed between the first data line DL1 and the second data line DL2, and extends substantially in the second direction D2. The second low storage line Cstl2 overlaps the low pixel electrode 160. The second low storage line Cstl2 is connected to the first low storage line Cstl1.

The second low storage line Cstl2 overlaps the first stem 162 of the low pixel electrode 160.

Figure 6:
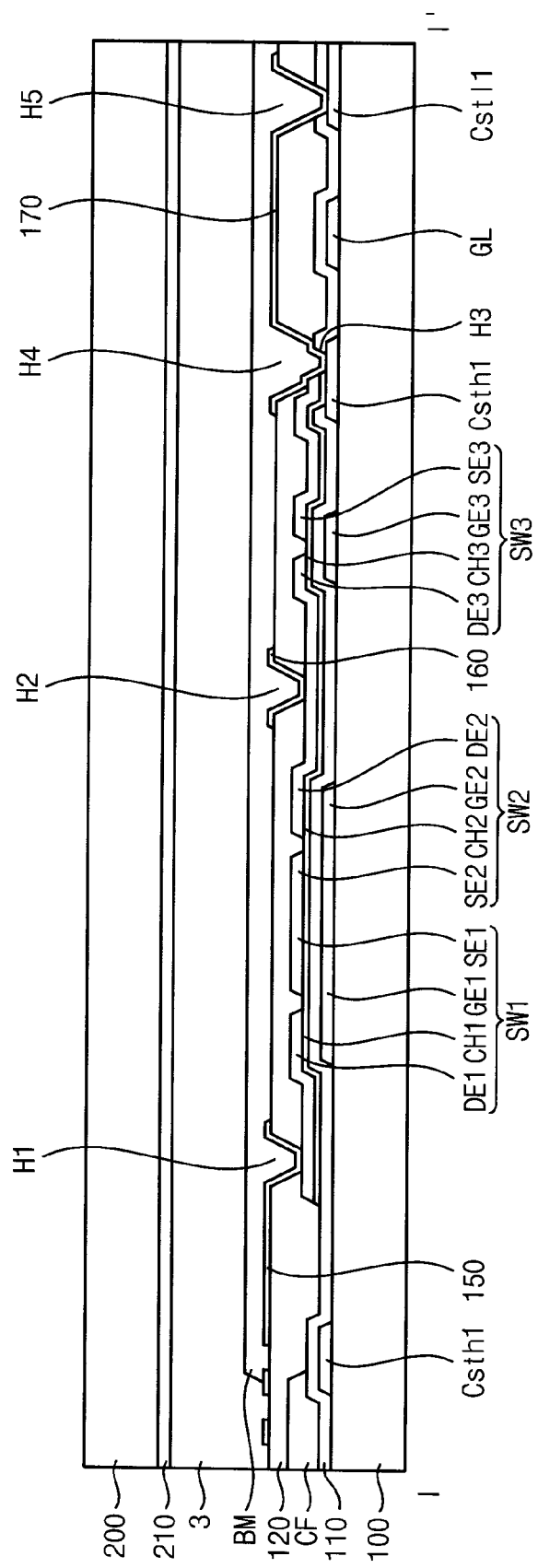
FIG. 6 is a cross-sectional view taken along line I-I' of FIG. 5.

FIG. 6 is a cross-sectional view taken along line I-I' of FIG. 5.

Referring to FIG. 6, an exemplary embodiment of a display panel includes a first substrate, a second substrate disposed opposite to, e.g., facing, the first substrate, and a liquid crystal layer 3 disposed between the first substrate and the second substrate.

The first substrate includes a first base substrate 100, a gate pattern, a first insulation layer 110, a channel layer, a data pattern, a color filter CF, a second insulation layer 120, a high pixel electrode 150, a low pixel electrode 160, a connecting electrode 170 and a black matrix BM.

The first base substrate 100 may include a material which has relatively high transmittance, thermal resistance or chemical resistance. In one exemplary embodiment, for example the first base substrate 100 may include glass, polyethylenenaphthalate, polyethylene terephthalate, polyacryl or a combination thereof.

The gate pattern is disposed on the first base substrate 100. The gate pattern includes a first high storage line Csth1, a second high storage line (referred to as Csth2 of FIG. 5), a first low storage line Cstl1, a second low storage line (referred to as Cstl2 of FIG. 5), a gate line GL, a first gate electrode GE1, a second gate electrode GE2 and a third gate electrode GE3.

The gate pattern may include a metal, a metal alloy, a metal nitride, a conductive metal oxide or a transparent conductive material, for example. In one exemplary embodiment, for example, the gate pattern may include copper (Cu), which is opaque.

The first insulation layer 110 is disposed on the gate pattern. The first insulation layer 110 covers and insulates the gate pattern, e.g., the first high storage line Csth1, the second high storage line, the first low storage line Cstl1, the second low storage line, the gate line GL, the first gate electrode GE1, the second gate electrode GE2 and the third gate electrode GE3.

A third contact hole H3 is defined through the first insulation layer 110 to expose a portion of the first high storage line Csth1.

The channel layer is dispose on the first insulation layer 110. The channel layer include a first channel portion CH1, a second channel portion CH2, and a third channel portion CH3. The first channel portion CH1 overlaps the first gate electrode GE1. The second channel portion CH2 overlaps the second gate electrode GE2. The third channel portion CH3 overlaps the third gate electrode GE3.

The data pattern is disposed on the channel layer. The data pattern includes a first drain electrode DE1, a first source electrode SE1, a second source electrode SE2, a second drain electrode DE2, a third source electrode SE3, a third drain electrode DE3, a first data line (referred to as DL1 of FIG. 5) and a second data line (referred to as DL2 of FIG. 5). The data pattern may include a metal, a metal alloy, a metal nitride, a conductive metal oxide, or a transparent conductive material, for example. In one exemplary embodiment, for example, the data pattern may include copper (Cu), which is opaque.

The first drain electrode DE1, the first source electrode SE1, the first channel portion CH1 and the first gate electrode GE1 collectively define a first switching element SW1.

The second drain electrode DE2, the second source electrode SE2, the second channel portion CH2 and the second gate electrode GE2 collectively define a second switching element SW2. The second source electrode SE2 is electrically connected to the first source electrode SE1.

The third drain electrode DE3, the third source electrode SE3, third channel portion CH3 and the third gate electrode GE3 collectively define a third switching element SW3. The third drain electrode DE3 is electrically connected to the second drain electrode DE2. The third source electrode SE3 may be partially filled in the third contact hole H3 defined through the first insulation layer 110.

The color filter CF is disposed on the first insulation layer 110 on which the data pattern is disposed. The color filter CF allows the light passing therethrough toward the liquid crystal layer 3 to have a color. The color filter CF may include a red color filter, a green color filter and blue color filter. The color filter CF corresponds to a unit pixel. The color filters adjacent to each other may have different colors. In an exemplary embodiment, the color filter CF may overlap adjacent color filter CF at a boundary of the adjacent unit pixels. In an alternative exemplary embodiment, the color filter CF may be spaced apart from the adjacent color filter CF at the boundary of the adjacent unit pixels.

The second insulation layer 120 is disposed on the first insulation layer 110 on which the color filter CF and the data pattern are disposed. The second insulation layer 120 covers and insulates the data pattern.

A fourth contact hole H4 is defined through the second insulation layer 120, such that a portion of the first high storage line Csth1 and a portion of the third drain electrode DE3, which is disposed below the first insulation layer 120, are exposed through the fourth contact hole H4.

A fifth contact hole H5 is defined through the first insulation layer 120 and the second insulation layer 120, such that a portion of the first low storage line Cstl1, which is disposed below the first insulation layer 120 and the second insulation layer 120, is exposed through the fifth contact hole H5.

A first contact hole H1 is defined through the second insulation layer 120, such that a portion of the first drain electrode DE1, which is disposed below the second insulation layer 120, is exposed through the first contact hole H1.

A second contact hole H2 is defined through the second insulation layer 120, such that a portion of the second drain electrode DE2 (or a portion of the third drain electrode DE3), which is disposed below the second insulation layer 120, is exposed through the second contact hole h2.

The high pixel electrode 150 is disposed on the second insulation layer 120. The high pixel electrode 150 is electrically connected to the first drain electrode DE1 through the first contact hole H1.

The low pixel electrode 160 is disposed on the second insulation layer 120. The low pixel electrode 160 is electrically connected to the second drain electrode DE2 (or the third drain electrode DE3) through the second contact hole H2.

The connecting electrode 170 is disposed on the second insulation layer 120. The connecting electrode 170 is electrically connected to the third source electrode SE3 through the fourth contact hole H4, and electrically connected to the first high storage line Csth1 through the third contact hole H3. Accordingly, the third drain electrode DE3, the first high storage line Csth1 and the connecting electrode 170 are electrically connected to each other.

The black matrix BM is disposed on the second insulation layer 120 on which the high pixel electrode 150, the low pixel electrode 160 and the connecting electrode 170 are disposed. The black matrix BM blocks light and is disposed corresponding to a non-display area on which an image is not displayed. The non-display is disposed adjacent to a display area on which the image is displayed. The black matrix BM overlaps the first data line, the second data line, and the first to third switching elements SW1, SW2 and SW3. In an exemplary embodiment, where the gate pattern includes an opaque material, the black matrix BM may overlap the first high storage line Csth1, the second high storage line, the first low storage line Cstl1 and the second low storage line.

The second substrate includes a second base substrate 200 and a common electrode 210.

The second base substrate 200 may include a material which has relatively high transmittance, thermal resistance and chemical resistance. In one exemplary embodiment, for example, the second base substrate 200 may include glass, polyethylenenaphthalate, polyethylene terephthalate, polyacryl or a combination thereof.

The common electrode 210 is disposed on the second base substrate 200.

The liquid crystal layer 3 is disposed between the first substrate and the second substrate. The liquid crystal layer 3 includes liquid crystal molecules having optical anisotropy. The liquid crystal molecules are driven by electric field, such that an image is displayed by controlling a blocking of light passing through the liquid crystal layer 3.

Figure 7:
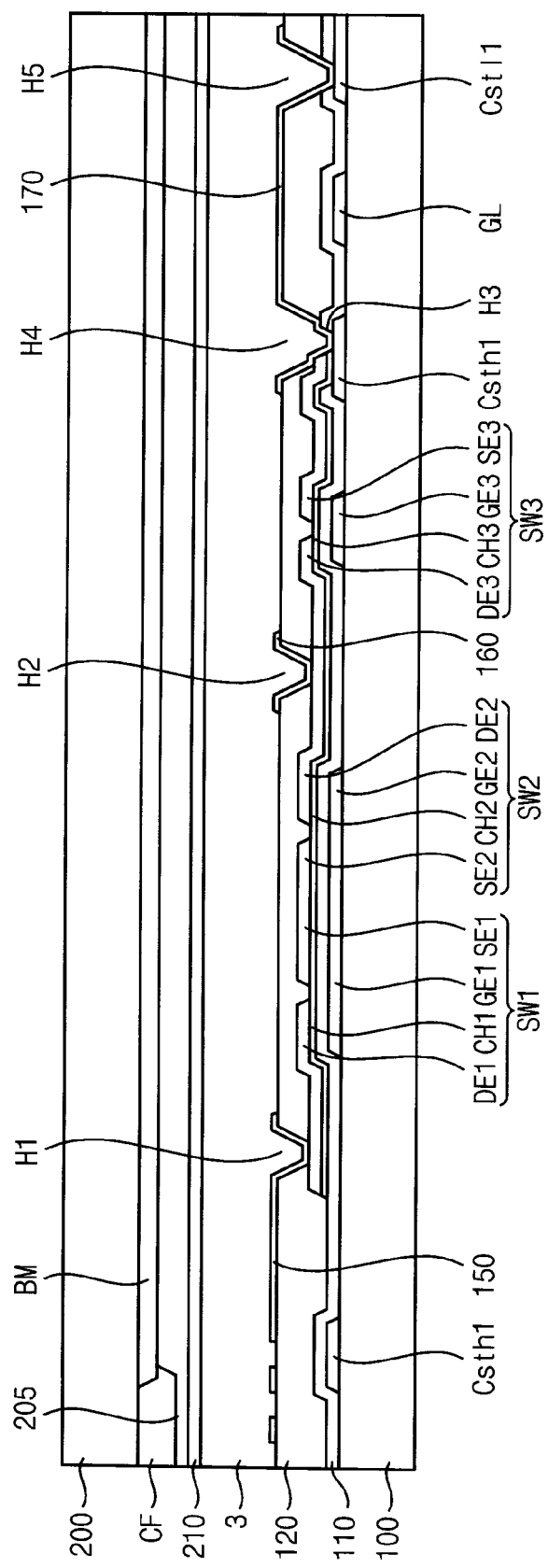
FIG. 7 is a cross-sectional view illustrating another alternative exemplary embodiment of a display panel, according to the invention.

FIG. 7 is a cross-sectional view illustrating another alternative exemplary embodiment of a display panel, according to the invention.

The display panel shown in FIG. 7 is substantially the same as the display panel shown in FIG. 6 except for a black matrix BM, a color filter CF and an over-coating layer 205. The same or like elements shown in FIG. 7 have been labeled with the same reference characters as used above to describe the exemplary embodiments of the display panel shown in FIG. 6, and any repetitive detailed description thereof will hereinafter be omitted or simplified.

In an exemplary embodiment, the first substrate, a second substrate facing the first substrate, and a liquid crystal layer 3 disposed between the first substrate and the second substrate.

The first substrate includes a first base substrate 100, a gate pattern, a first insulation layer 110, a channel layer, a data pattern, a second insulation layer 120, a high pixel electrode 150, a low pixel electrode 160 and a connecting electrode 170.

The gate pattern is disposed on the first base substrate 100. The gate pattern includes a first high storage line Csth1, a second high storage line (referred to as Csth2 of FIG. 5), a first low storage line Cstl1, a second low storage line (referred to as Cstl2 of FIG. 5), a gate line GL, a first gate electrode GE1, a second gate electrode GE2 and a third gate electrode GE3.

The first insulation layer 110 is disposed on the gate patter. The first insulation layer 110 covers and insulates the gate pattern, e.g., the first high storage line Csth1, the second high storage line, the first low storage line Cstl1, the second low storage line, the gate line GL, the first gate electrode GE1, the second gate electrode GE2 and the third gate electrode GE3.

A third contact hole H3 is defined through the first insulation layer 110 to expose a portion of the first high storage line Csth1.

The channel layer is dispose on the first insulation layer 110. The channel layer include a first channel portion CH1, a second channel portion CH2, and a third channel portion CH3. The first channel portion CH1 overlaps the first gate electrode GE1. The second channel portion CH2 overlaps the second gate electrode GE2. The third channel portion CH3 overlaps the third gate electrode GE3.

The data pattern is disposed on the channel layer. The data pattern includes a first drain electrode DE1, a first source electrode SE1, a second source electrode SE2, a second drain electrode DE2, a third source electrode SE3, a third drain electrode DE3, a first data line (referred to as DL1 of FIG. 5) and a second data line (referred to as DL2 of FIG. 5).

The first drain electrode DE1, the first source electrode SE1, the first channel portion CH1 and the first gate electrode GE1 collectively define a first switching element SW1.

The second drain electrode DE2, the second source electrode SE2, the second channel portion CH2 and the second gate electrode GE2 collectively define a second switching element SW2. The second source electrode SE2 is electrically connected to the first source electrode SE1.

The third drain electrode DE3, the third source electrode SE3, third channel portion CH3 and the third gate electrode GE3 collectively define a third switching element SW3. The third drain electrode DE3 is electrically connected to the second drain electrode DE2. The third source electrode SE3 may be partially filled in the third contact hole H3 defined through the first insulation layer 110.

The second insulation layer 120 is disposed on the data pattern. The second insulation layer 120 covers and insulates the data pattern.

A fourth contact hole H4 is defined through the second insulation layer 120, such that a portion of the first high storage line Csth1 and a portion of the third drain electrode DE3, which are disposed below the second insulation layer 120, are exposed through the fourth contact hole H4.

A fifth contact hole H5 is defined through the first insulation layer 120 and the second insulation layer 120, such that a portion of the first low storage line Cstl1, which is disposed below the first insulation layer 120 and the second insulation layer 120, is exposed through the fifth contact hole H5.

A first contact hole H1 is defined through the second insulation layer 120, such that a portion of the first drain electrode DE1, which is disposed below the second insulation layer 120, is exposed through the first contact hole H1.

A second contact hole H2 is defined through the second insulation layer 120, such that a portion of the second drain electrode DE2 (or a portion of the third drain electrode DE3), which is disposed below the second insulation layer 120, is exposed.

The high pixel electrode 150 is disposed on the second insulation layer 120. The high pixel electrode 150 is electrically connected to the first drain electrode DE1 through the first contact hole H1.

The low pixel electrode 160 is disposed on the second insulation layer 120. The low pixel electrode 160 is electrically connected to the second drain electrode DE2 (or the third drain electrode DE3) through the second contact hole H2.

The connecting electrode 170 is disposed on the second insulation layer 120. The connecting electrode 170 is electrically connected to the third source electrode SE3 through the fourth contact hole H4, and electrically connected to the first high storage line Csth1 through the third contact hole H3. Accordingly, the third drain electrode DE3, the first high storage line Csth1 and the connecting electrode 170 are electrically connected to each other.

The second substrate includes a second base substrate 200, a black matrix BM, a color filter CF and a common electrode 210.

The black matrix BM is disposed on the second bases substrate 200. The black matrix BM overlaps the first data line, the second data line, and the first to third switching elements SW1, SW2 and SW3. In an exemplary embodiment, where the gate pattern includes an opaque material, the black matrix BM may overlap the first high storage line Csth1, the second high storage line, the first low storage line Cstl1 and the second low storage line.

The color filter CF is disposed on the second bases substrate 200 on which the black matrix BM is formed. The color filter CF allows the light passing therethrough toward the liquid crystal layer 3 to have a color. The color filter CF may include a red color filter, a green color filter and blue color filter. The color filter CF corresponds to a unit pixel. The color filters adjacent to each other may have different colors. In an exemplary embodiment, the color filter CF may overlap adjacent color filter CF at a boundary of the adjacent unit pixels. In an alternative exemplary embodiment, the color filter CF may be spaced apart from the adjacent color filter CF at the boundary of the adjacent unit pixels.

The over-coating layer 205 is disposed on the color filter CF and the black matrix BM. The over-coating layer 205 flattens the color filter CF, protects the color filter CF and insulates the color filter CF. The over-coating layer 205 may include acrylic-epoxy material, for example.

The common electrode 210 is disposed on the over-coating layer 205.

The liquid crystal layer 3 is disposed between the first substrate and the second substrate. The liquid crystal layer 3 includes liquid crystal molecules having optical anisotropy. The liquid crystal molecules are driven by electric field, such that an image is displayed by controlling a blocking of light through the liquid crystal layer 3.

FIGS. 8A to 14 are cross-sectional views illustrating an exemplary embodiment of a method of manufacturing the display panel of FIG. 5.

Figure 8A:
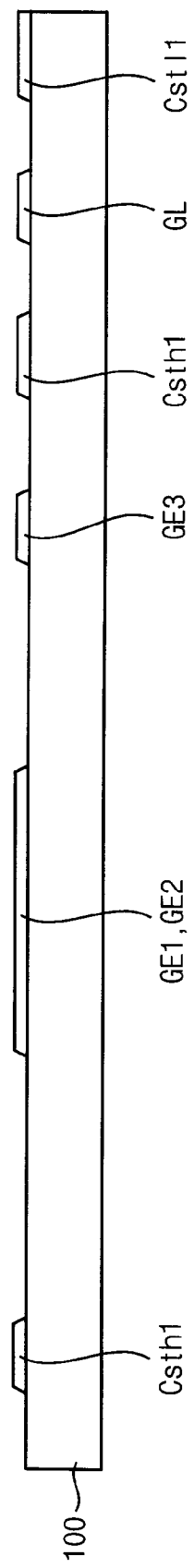
FIGS. 8A to 14 are cross-sectional views illustrating an exemplary embodiment of a method of manufacturing the display panel of FIG. 5.
Figure 8B:
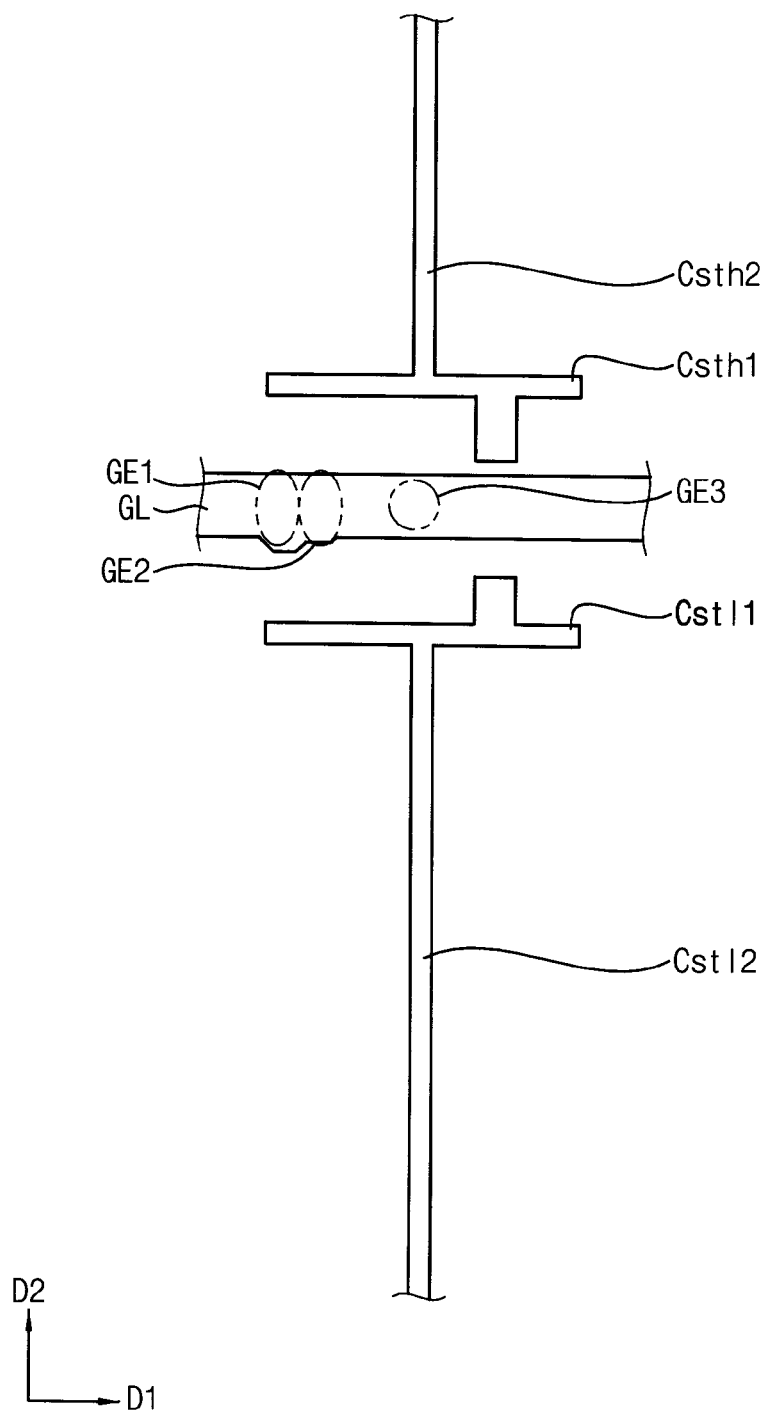

Referring to FIGS. 8A and 8B, a metal layer is provided, e.g., formed or disposed, on a first bases substrate 100, and then the metal layer may be partially etched by a photolithography process or an etching process using an etching mask, such that the gate pattern is provided. The gate pattern includes a first high storage line Csth1, a second high storage line (referred to as Csth2 of FIG. 5), a first low storage line Cstl1, a second low storage line (referred to as Cstl2 of FIG. 5), a gate line GL, a first gate electrode GE1, a second gate electrode GE2 and a third gate electrode GE3.

The gate line GL extends substantially in a first direction D1. The gate line GL is electrically connected to a first gate electrode GE1, the second gate electrode GE2 and the third gate electrode GE3.

The first high storage line Csth1 extends substantially in the first direction D1, and is disposed adjacent to the gate line GL.

The second high storage line Csth2 is disposed between the first data line DL1 and the second data line DL2, and extends substantially in the second direction D2. The second high storage line Csth2 is electrically connected to the first high storage line Csth1.

The first low storage line Cstl1 is disposed adjacent to the gate line GL, and opposite to the first high storage line Csth1 with reference to the gate line GL. The first low storage line Cstl1 extends substantially in the first direction D1.

The second low storage line Cstl2 extends substantially in the second direction D2. The second low storage line Cstl2 is electrically connected to the first low storage line Cstl1.

The second high storage line Csth2 is electrically connected to a second low storage line of an adjacent pixel in the second direction D2. In such an embodiment, the second low storage line Cstl2 is electrically connected to a second high storage line of and adjacent pixel in the second direction D2. Thus, in such an embodiment of the display panel, second high storage lines and second low storage lines may be electrically connected to each other along the second direction D2 (referred to as Cst of FIG. 17).

Figure 9:
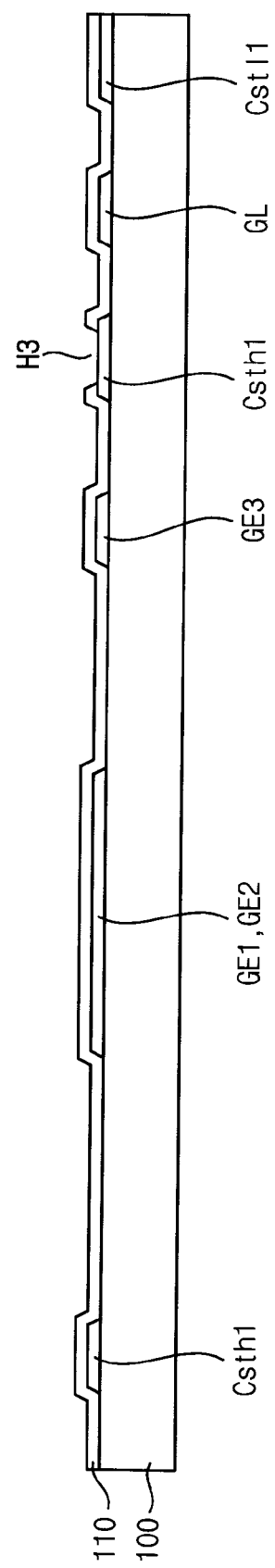

Referring to FIG. 9, a first insulation layer 110 is provided on the first base substrate 100 on which the gate pattern is provided. The first insulation layer 110 may be formed by a spin coating process, a printing process, a sputtering process, a chemical vapor deposition ("CVD") process, an atomic layer deposition ("ALD") process, a plasma-enhanced chemical vapor deposition ("PECVD") process, a high-density plasma chemical vapor deposition ("HDP-CVD") process or a vacuum evaporation process, for example, in accordance with a material of the first insulation layer 110.

A third contact hole H3 is formed through the first insulation layer 110 to expose a portion of the first high storage line Csth1

Figure 10A:
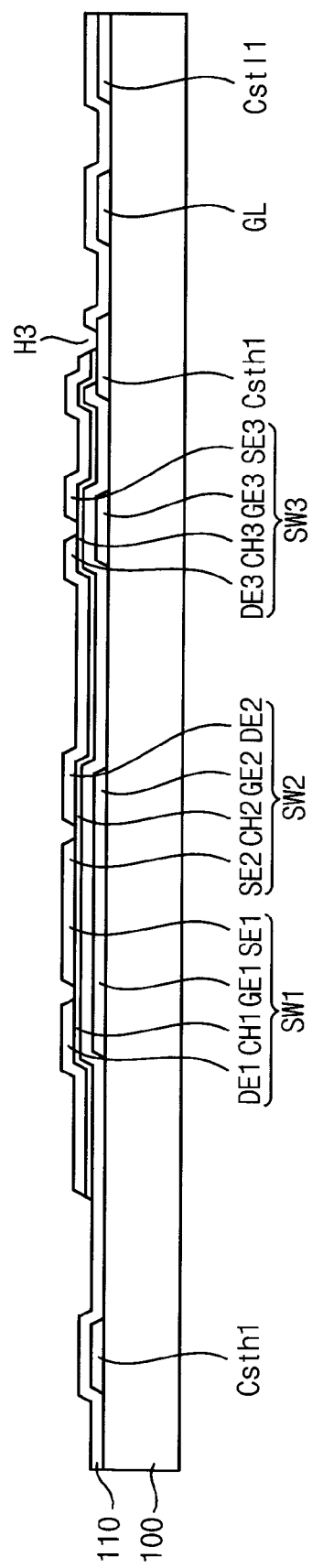
Figure 10B:
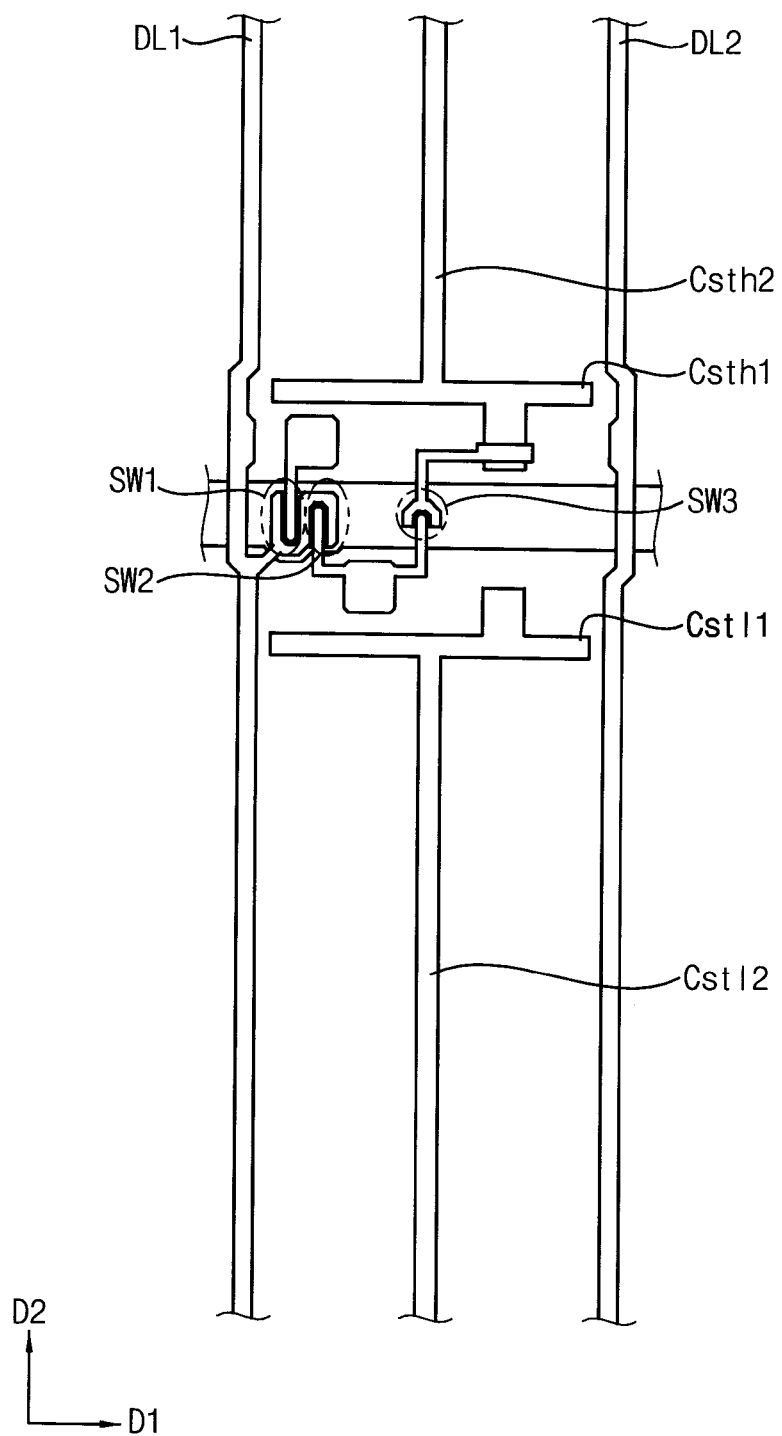

Referring to FIGS. 10A and 10B, a semiconductor layer and a metal layer are provided on the first insulation layer 110, and then the semiconductor layer and the metal layer may be partially etched by a photolithography process or an etching process using an etching mask, such that the channel layer having first to third channel portions CH1, CH2 and CH3, and a data pattern are provided. The semiconductor layer may include a silicon semiconductor layer including a-Si:H and an ohmic contact layer including n+ a-Si:H. In an exemplary embodiment, the first channel portion CH1 may include an oxide semiconductor. In such an embodiment, the oxide semiconductor may include an amorphous oxide including indium (In), zinc (Zn), gallium (Ga), tin (Sn), hafnium (Hf) or a combination thereof, for example.

The data pattern includes a first drain electrode DE1, a first source electrode SE1, a second source electrode SE2, a second drain electrode DE2, a third source electrode SE3, a third drain electrode DE3, a first data line DL1 and a second data line DL2. In one exemplary embodiment, for example, the semiconductor later and the metal layer are patterned at the same time, and then a portion of the metal layer, which is patterned, is removed, such that the first source electrode SE1 and the first drain electrode DE1 spaced apart from the first source electrode SE1 are provided. In such an embodiment, the second source electrode SE2 and the second drain electrode DE2 spaced apart from the second source electrode SE2 may be provided by removing a portion of the patterned metal layer. In such an embodiment, the third source electrode SE3 and the third drain electrode DE3 spaced apart from the third source electrode SE3 may be provided by removing a portion of the patterned metal layer.

The first drain electrode DE1, the first source electrode SE1, the first channel portion CH1 and the first gate electrode GE1 collectively define a first switching element SW1.

The second drain electrode DE2, the second source electrode SE2, the second channel portion CH2 and the second gate electrode GE2 collectively define a second switching element SW2. The second source electrode SE2 is electrically connected to the first source electrode SE1.

The third drain electrode DE3, the third source electrode SE3, third channel portion CH3 and the third gate electrode GE3 collectively define a third switching element SW3. The third drain electrode DE3 is electrically connected to the second drain electrode DE2. The third source electrode SE3 may be partially filled in a third contact hole H3 formed through the first insulation layer 110.

The first data line DL1 extends substantially in the second direction D2, and crosses the gate line GL. The first data line DL1 is electrically connected to a first source electrode SE1 of the first switching element SW1, and a second source electrode SE2 of the second switching element SW2.

The second data line DL2 is spaced apart from the first data line DL1, extends substantially in the second direction D2, and crosses the gate line GL. The second data line DL2 is electrically connected to a first source electrode of a first switching element of an adjacent pixel, and a second source electrode of the second switching element of the adjacent pixel (referred to as FIG. 15).

Figure 11:
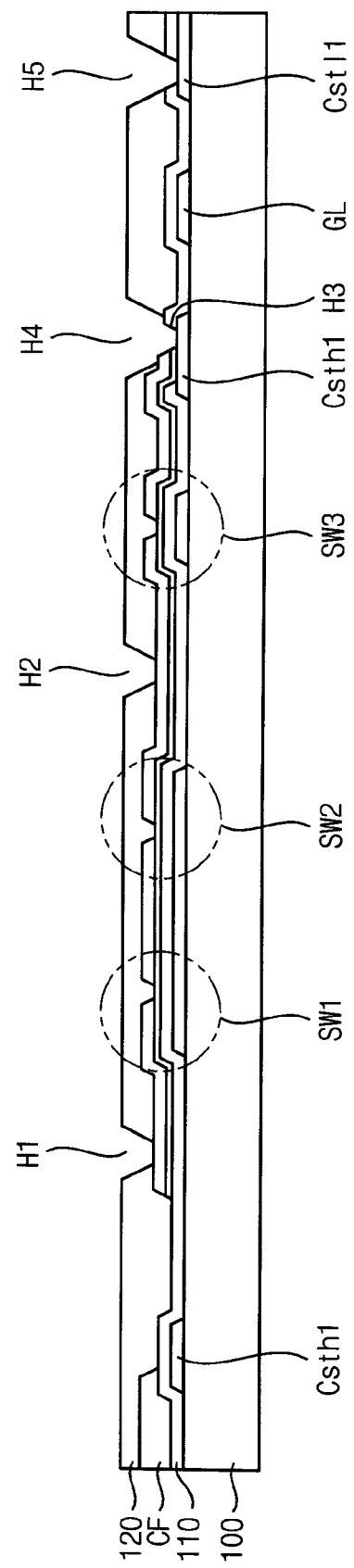

Referring to FIG. 11, a color filter CF is provided on the first insulation layer 110 on which the data pattern is provided. A photoresist is provided on the first insulation layer 110 on which the data pattern is provided, and then the photoresist is exposed using a mask, and then the photoresist is developed using a developing solution, such that the color filter CF may be provided.

A second insulation layer 120 is provided on the first insulation layer 110 on which the color filter CF is provided.

A fourth contact hole H4 is formed through the second insulation layer 120, such that a portion of the first high storage line Csth1 and a portion of the third drain electrode DE3 are exposed therethrough.

A fifth contact hole H5 is formed through the first insulation layer 120 and the second insulation layer 120, such that a portion of the first low storage line Cstl1 is exposed.

A first contact hole H1 is formed through the second insulation layer 120, such that a portion of the first drain electrode DE1 is exposed therethrough.

A second contact hole H2 is formed through the second insulation layer 120, a portion of the second drain electrode DE2 (or a portion of the third drain electrode DE3) is exposed therethrough.

Figure 12B:
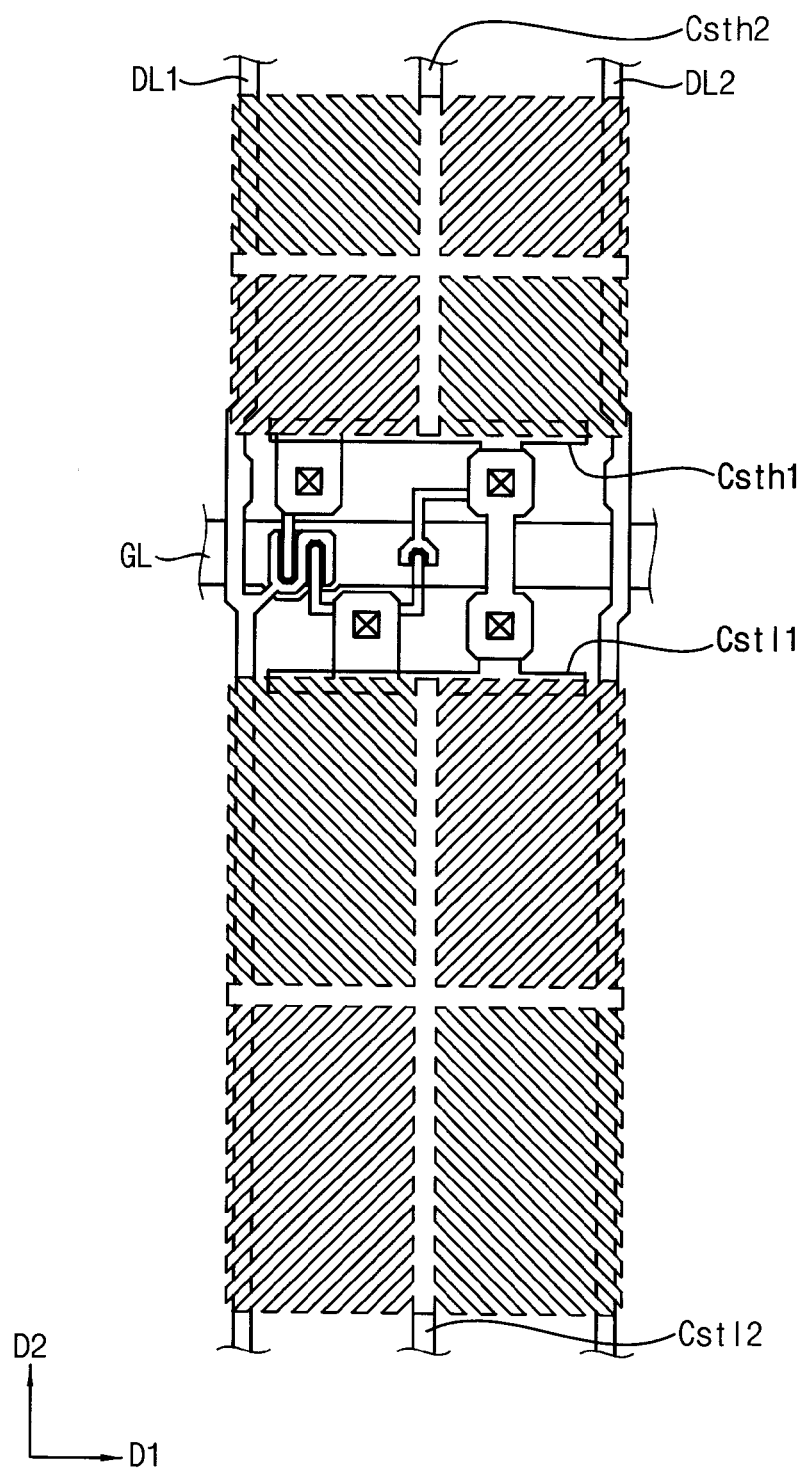

Referring to FIGS. 12A and 12B, a transparent conductive layer is provided on the second insulation layer 120, and then transparent conductive layer may be partially etched by a photolithography process or an etching process using an etching mask, such that a high pixel electrode 150, a low pixel electrode 160 and a connecting electrode 170 may be provided. The transparent conductive layer may include indium tin oxide ("ITO") or indium zinc oxide ("IZO"), for example.

The low pixel electrode 160 is disposed opposite to the high pixel electrode 150 with reference to the gate line GL, and between the first data line DL1 and the second data line DL2. The low pixel electrode 160 is electrically connected to a second drain electrode DE2 of the second switching element SW2 through the second contact hole H2. A side portion of the low pixel electrode 160 may overlap the first data line DL1 and the second data line DL2.

The high pixel electrode 150 is disposed adjacent to the gate line GL in the second direction D2, and between the first data line DL1 and the second data line DL2. The high pixel electrode 150 is electrically connected to a first drain electrode DE1 of the first switching element SW1 through the first contact hole H1. A side portion of the high pixel electrode 150 may overlap the first data line DL1 and the second data line DL2.

The connecting electrode 170 is electrically connected to the third source electrode SE3 of the third switching element SW3 and the first high storage line Csth1 through the third contact hole H3 and the fourth contact hole H4. In such an embodiment, the connecting electrode 170 extends substantially in the second direction D2, and electrically connected to the first low storage line Cstl1 through the fifth contact hole H5.

The high pixel electrode 150 includes a first stem 152 that extends substantially in the second direction D2, and a second stem 154 that extends substantially in the first direction D1 and crosses the first stem 152. The first and second stems 152 and 154 may divide the high pixel electrode 150 into four domains each of which has substantially a same area as each other.

The low pixel electrode 160 includes a first stem 162 that extends substantially in the second direction D2, and a second stem 164 that extends substantially in the first direction D1 and crosses the first stem 162. The first and second stems 162 and 164 may divide the low pixel electrode 160 into four domains each of which has substantially a same area as each other.

Figure 13:
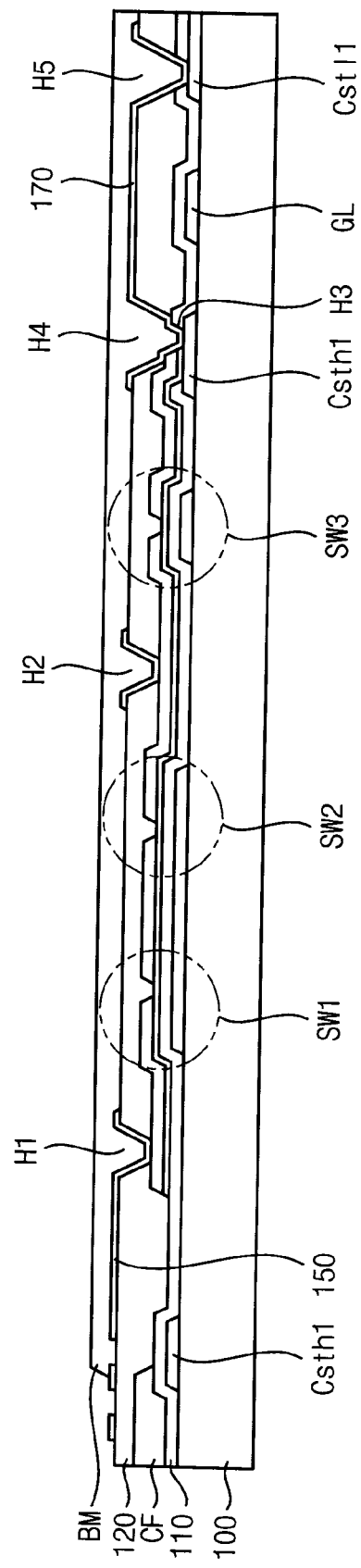

Referring to FIG. 13, a black matrix BM is provided on the second insulation layer 120 on which the high pixel electrode 150, the low pixel electrode 160 and the connecting electrode 170 are provided. The black matrix BM overlaps the first data line DL1, the second data line DL2, and the first to third switching elements SW1, SW2 and SW3. In an exemplary embodiment, where the gate pattern includes an opaque material, the black matrix BM may overlap the first high storage line Csth1, the second high storage line Csth2, the first low storage line Cstl1 and the second low storage line Cstl2.

Figure 14:
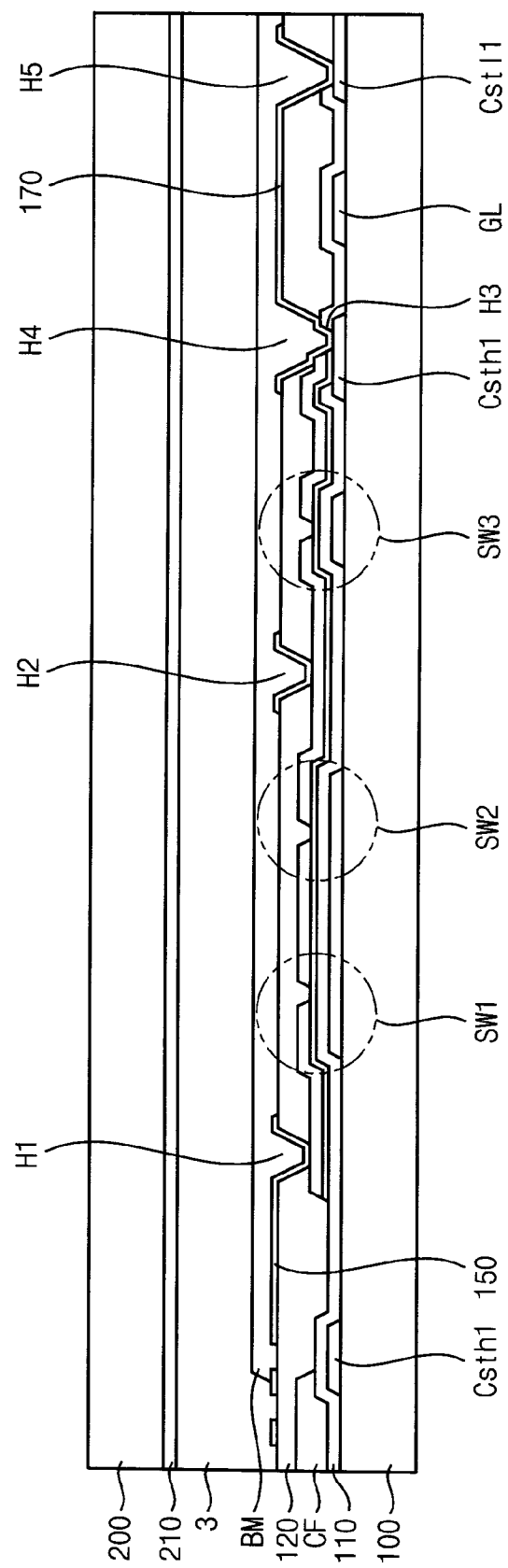

Referring to FIG. 14, a common electrode 210 is provided on a second base substrate 200. The common electrode 210 may be a transparent conductive layer. In one exemplary embodiment, for example, the common electrode 210 may include ITO or IZO, for example.

The first base substrate 100, the gate pattern, the first insulation layer 110, the channel layer, the data pattern, the color filter CF, the second insulation layer 120, the high pixel electrode 150, the low pixel electrode 160, the connecting electrode 170 and the black matrix BM define a first substrate. The second base substrate 200 and the common electrode 210 define a second substrate. A liquid crystal layer 3 including liquid crystal molecules having optical anisotropy is provided between the first substrate and the second substrate.

Figure 15:
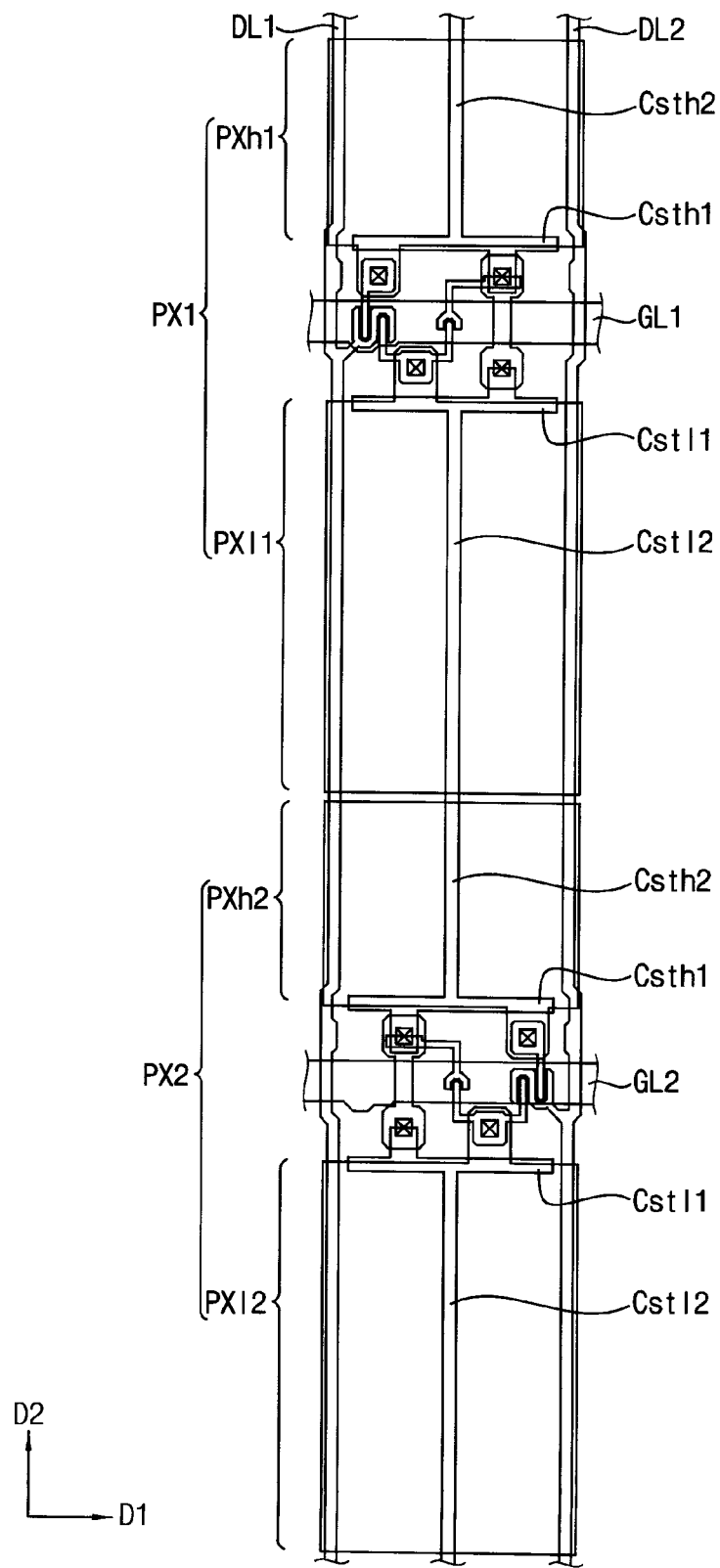
FIG. 15 is a plan view illustrating a connecting structure of pixels of an exemplary embodiment of a display panel, according to the invention.

FIG. 15 is a plan view showing a connecting structure of pixels of an exemplary embodiment of a display panel, according to the invention.

Referring to FIG. 15, a display panel includes a plurality of pixels, e.g., a first pixel PX1 and a second pixel PX2 disposed adjacent to the first pixel PX1 in a second direction D2. The first pixel PX1 includes a first high pixel PXh1 and a first low pixel PXl1. The second pixel PX2 includes a second high pixel PXh2 and a second low pixel PXl2.

The first pixel PX1 shown in FIG. 15 is substantially the same as a pixel of FIG. 1. The second pixel PX2 is substantially the same as a pixel that is reversed from the first pixel PX1 in a first direction D1, which is substantially perpendicular the second direction D2.

A first data line DL1 and a first gate line GL1 is connected to the first pixel PX1. A second gate line GL2 and a second data line DL2 is connected to second pixel PX2.

In an exemplary embodiment, as shown in FIG. 15, a second low storage line Cstl2 of the first low pixel PXl1 of the first pixel PX1 is connected to a second high storage line Csth2 of the second high pixel PXh2 of the second pixel PX2.

In such an embodiment, a second low storage line Cstl2 of the first low pixel PXl1 is connected to a first low storage line Cstl1 of the first low pixel PXl1. The first low storage line Cstl1 of the first low pixel PXl1 is electrically connected to a first high storage line Csth1 of the first high pixel PXh1 through a connecting electrode (referred to as 170 of FIG. 1). The first high storage line Csth1 of the first high pixel PXh1 is connected to a second high storage line Csth2 of the first high pixel PXh1.

In such an embodiment, the second high storage line Csth2 of the second high pixel PXh2 is connected to a first high storage line Csth1 of the second high pixel PXh2. The first high storage line Csth1 of the second high pixel PXh2 is electrically connected to a first low storage line Cstl1 of the second low pixel PXl2 through a connecting electrode (referred to as 170 of FIG. 1). The first low storage line Cstl1 of the second low pixel PXl2 is connected to a second low storage line Cstl2 of the second low pixel PXl2.

Accordingly, in such an embodiment, the second low storage lines and the second high storage lines are electrically connected to each other along the second direction D2.

Figure 16:
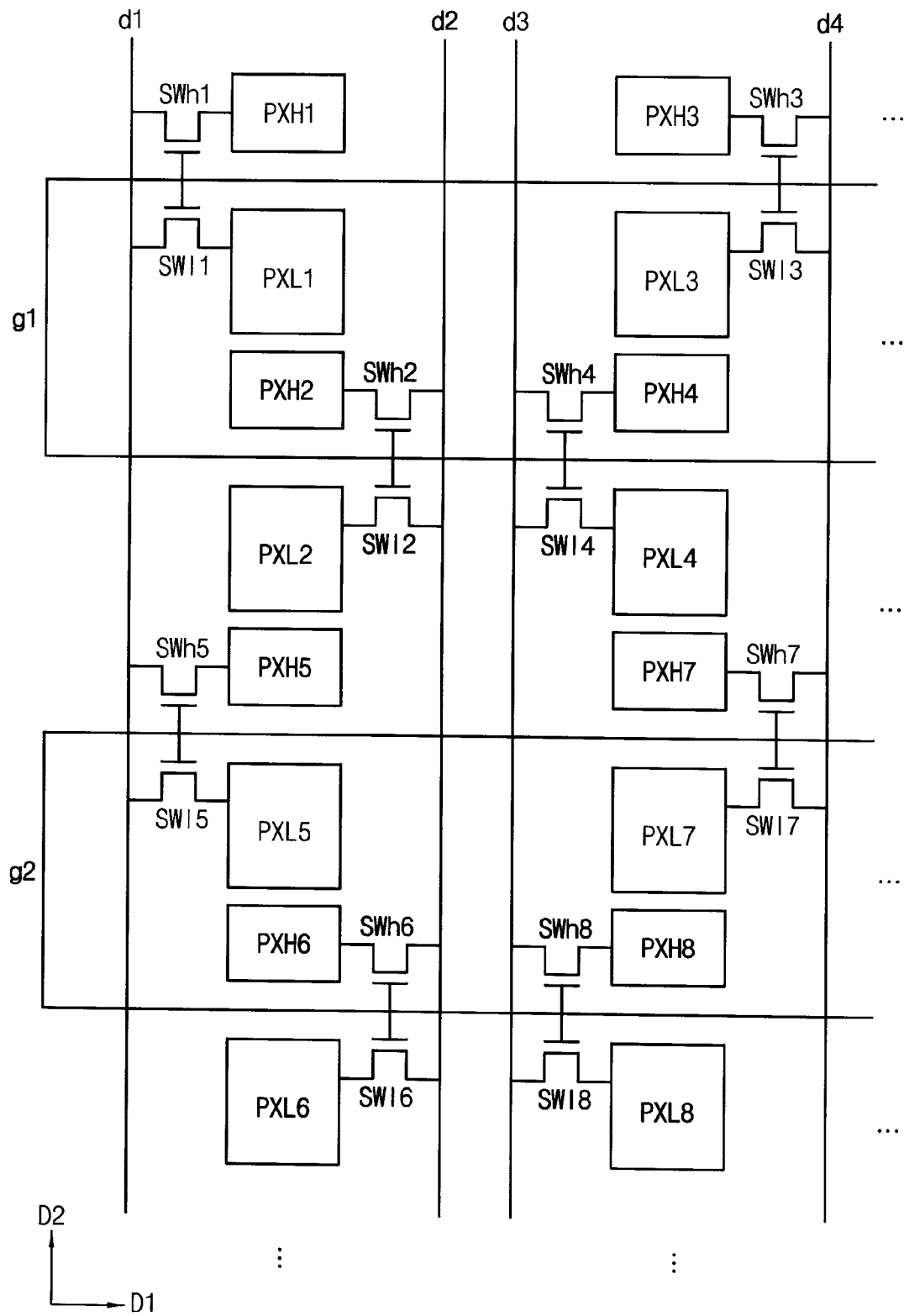
FIG. 16 is a plan view schematically illustrating a connecting structure of pixels of an exemplary embodiment of a display panel, according to the invention.

FIG. 16 is a plan view schematically illustrating a connecting structure of pixels of an exemplary embodiment of a display panel, according to the invention.

Referring to FIG. 16, an exemplary embodiment of a display panel includes first to fourth data lines, first to fourth gate lines, and first to eighth pixels. First to fourth data signals d1, d2, d3 and d4 are applied to the first to fourth data lines, respectively. A first gate signal g1 is applied to the first and second gate lines. A second gate signal g2 is applied to the third and fourth gate lines.

Each of the first to fourth data lines extends substantially in the second direction D2, and are arranged substantially in a first direction D1, which is substantially perpendicular to the second direction D2. In one exemplary embodiment, for example, a plurality of pixels may be defined by the gate lines and the data lines, but not being limited thereto.

The first pixel includes a first high pixel PXh1 and a first low pixel PXl1. The second pixel PX2 includes a second high pixel PXh2 and a second low pixel PXl2. The third pixel PX3 includes a third high pixel PXh3 and a third low pixel PXl3. The fourth pixel PX4 includes a fourth high pixel PXh4 and a fourth low pixel PXl4. The fifth pixel PX5 includes a fifth high pixel PXh5 and a fifth low pixel PXl5. The sixth pixel PX6 includes a sixth high pixel PXh6 and a sixth low pixel PXl6. The seventh pixel PX7 includes a seventh high pixel PXh7 and a seventh low pixel PXl7. The eighth pixel PX8 includes an eighth high pixel PXh8 and an eighth low pixel PXl8.

The first, second, fifth and sixth pixels are arranged in the second direction D2. The third, fourth, seventh and eighth pixels are arranged in the second direction D2, and disposed adjacent to the first, second, fifth and sixth pixels, respectively, in the first direction D1.

The first high pixel PXh1 of the first pixel is connected to a first high switching element SWh1. The first low pixel PXl1 of the first pixel is connected to a first low switching element SWl1. The first high switching element SWh1 and the first low switching element SWl1 are connected to the first gate line and the first data line.

The second high pixel PXh2 of the second pixel is connected to a second high switching element SWh2. The second low pixel PXl2 of the second pixel is connected to a second low switching element SWl2. The second high switching element SWh2 and the second low switching element SWl2 are connected to the second gate line and the second data line.

The third high pixel PXh3 of the third pixel is connected to a third high switching element SWh3. The third low pixel PXl3 of the third pixel is connected to a third low switching element SWl3. The third high switching element SWh3 and the third low switching element SWl3 are connected to the first gate line and the fourth data line.

The fourth high pixel PXh4 of the fourth pixel is connected to a fourth high switching element SWh4. The fourth low pixel PXl4 of the fourth pixel is connected to a fourth low switching element SWl4. The fourth high switching element SWh4 and the fourth low switching element SWl4 are connected to the first gate line and the third data line.

The fifth high pixel PXh5 of the fifth pixel is connected to a fifth high switching element SWh5. The fifth low pixel PXl5 of the fifth pixel is connected to a fifth low switching element SWl5. The fifth high switching element SWh5 and the fifth low switching element SWl5 are connected to the third gate line and the first data line.

The sixth high pixel PXh6 of the sixth pixel is connected to a sixth high switching element SWh6. The sixth low pixel PXl6 of the sixth pixel is connected to a sixth low switching element SWl6. The sixth high switching element SWh6 and the sixth low switching element SWl6 are connected to the fourth gate line and the second data line.

The seventh high pixel PXh7 of the seventh pixel is connected to a seventh high switching element SWh7. The seventh low pixel PXl7 of the seventh pixel is connected to a seventh low switching element SWl7. The seventh high switching element SWh7 and the seventh low switching element SWl7 are connected to the third gate line and the fourth data line.

The eighth high pixel PXh8 of the eighth pixel is connected to an eighth high switching element SWh8. The eighth low pixel PXl8 of the eighth pixel is connected to an eighth low switching element SWl8. The eighth high switching element SWh8 and the eighth low switching element SWl8 are connected to the fourth gate line and the third data line.

In such an embodiment, switching elements of adjacent pixels may be symmetrically disposed, e.g., may be in reflection or rotational symmetry.

Figure 17:
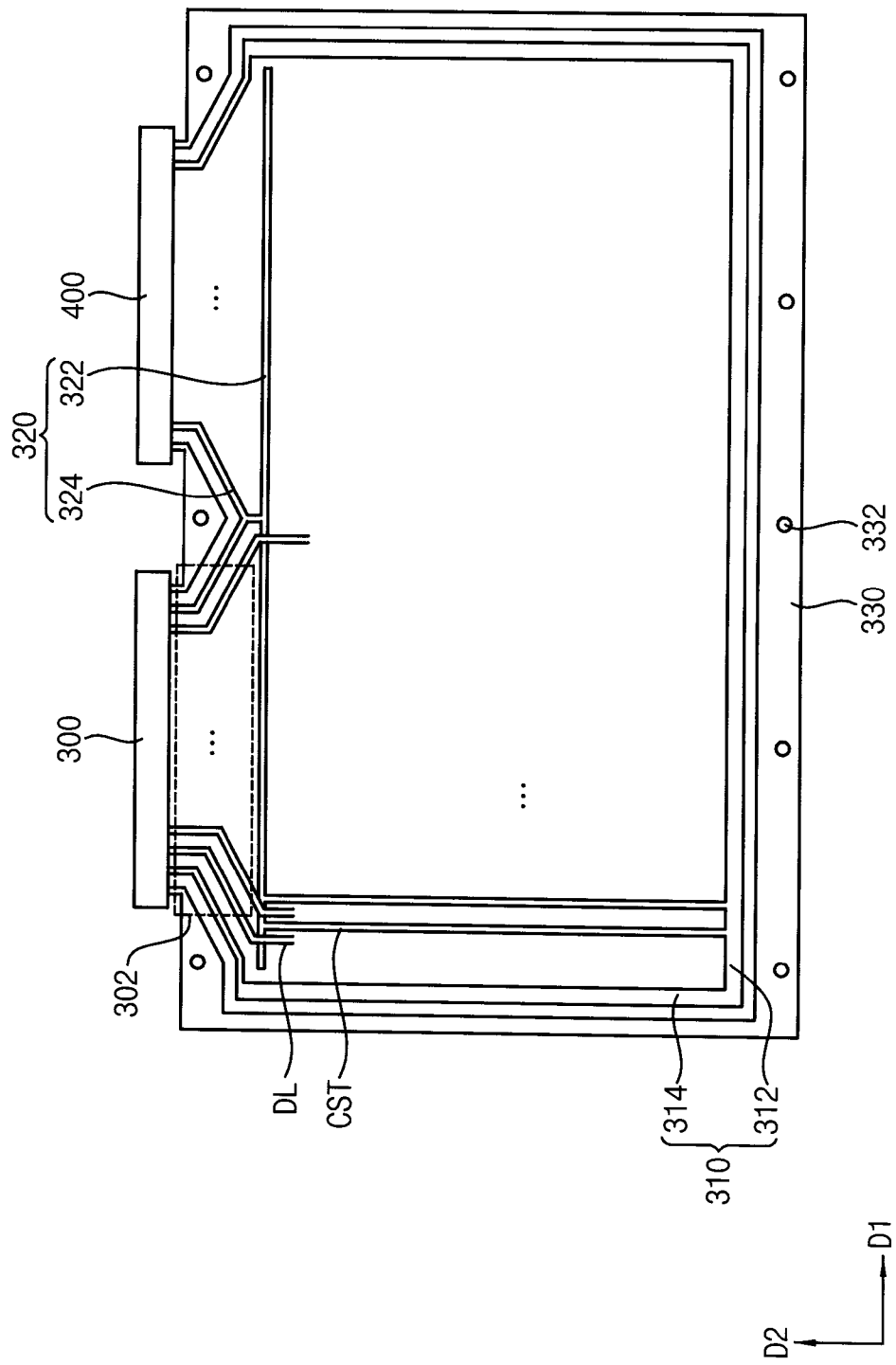
FIG. 17 is a plan view illustrating a wiring structure of an exemplary embodiment of a display panel, according to the invention.

FIG. 17 is a plan view illustrating a wiring structure of an exemplary embodiment of a display panel, according to the invention.

Referring to FIG. 17, an exemplary embodiment of a display panel includes a first driving part 300, a second driving part 400, a plurality of data lines DL, a plurality of storage lines Cst, a first storage compensating line 310, a second storage compensating line 320 and a ground line 330. The data lines DL extend substantially in a second direction D2, and are arranged substantially in a first direction, which is substantially perpendicular to the second direction D2. Each of the storage lines Cst is disposed between two adjacent data lines of the data lines DL. The storage lines Cst extends substantially in the second direction D2, and are arranged substantially in the first direction D1.

The first driving part 300 and the second driving part 400 are disposed in a peripheral area, which is adjacent to a display area, on which an image is displayed. The first driving part 300 and the second driving part 400 may be integrated circuit ("IC") chips. The data lines DL are connected to the first driving part 300 or the second driving part 400. The first and second driving parts 300 and 400 drive pixels of the display panel. In an exemplary embodiment, as shown in FIG. 17, a fan out area 302 is defined between the first driving part 300 and the display area, on which the image is displayed. Wiring are expanded in the fan out area 302. In such an embodiment, a fan out area may be defined between the second driving part 400 and the display area.

The first storage compensating line 310 is connected to the first driving part 300 and the second driving part 400. In an exemplary embodiment, the first storage compensating line 310 is disposed in the peripheral area. In such an embodiment, the first storage compensating line 310 may extend along a side portion of the display panel. The first storage compensating line 310 is connected to the storage lines Cst to provide a storage voltage to the storage lines Cst.

The first storage compensating line 310 includes a first portion 312 and a second portion 314. The first portion 312 is disposed opposite to the first driving part 300 and the second driving part 400 with reference to the display area, and extends substantially in the first direction D1. The second portion 314 connects the first portion 312 to the first or second driving part 300 or 400. The second portion 314 extends substantially in the second direction D2.

The second storage compensating line 320 is connected to the first driving part 300 and the second driving part 400. The second storage compensating line 320 is disposed in the peripheral area. The second storage compensating line 320 is connected to the storage lines Cst to provide a storage voltage to the storage lines Cst.

The second storage compensating line 320 includes a first portion 322 and a second portion 324. The first portion 322 is disposed adjacent to the first driving part 300 and the second driving part 400 with reference to the display area, and extends substantially in the first direction D1. The second portion 324 is disposed between the first portion 322 and the first and second driving parts 300 and 400, and directly connects the first portion 322 to the first or second driving part 300 or 400.

In an exemplary embodiment, as described above, the first storage compensating line 310 and the second storage compensating line 320 are disposed both sides of the display panel with reference to the display area in the second direction D2, and are connected to the storage lines Cst, such that the storage voltage applied to the storage lines Cst may be effectively maintained.

The ground line 330 is connected to the first driving part 300 and the second driving part 400, and disposed corresponding to the peripheral area. Thus, the ground line 330 extends substantially along a side portion of the display panel. The ground line 330 may include a plurality of ground terminals 332. The ground terminals 332 may be openings, and may be connected to a ground portion of a receiving container of a display apparatus by a bolt.

According to exemplary embodiments of the present invention as described herein, a display panel includes a high storage line that overlaps second stems of high and low pixel electrode, such that an aperture ratio and display quality at a boundary of pixels may be substantially improved.

In such embodiments, the high and low storage lines do not overlaps first and second data lines, such that the display quality may be substantially improved by effectively preventing a coupling capacitor at the boundary of the pixels.

In such embodiments, the high and low pixel electrodes overlap the first and second data lines, such that the aperture ratio may be substantially improved.

In such embodiments, the display panel includes a storage compensating line disposed at side portions or a peripheral area of the display panel, such that a storage voltage may be stably provided.

The invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the spirit or scope of the invention as defined by the following claims.

What is claimed is:

1. A display panel comprising:
    a high pixel electrode comprising:
        a first stem which extends substantially in a first direction; and
        a second stem which extends substantially in a second direction crossing the first direction;
    a low pixel electrode comprising:
        a first stem which extends substantially in the first direction; and
        a second stem which extends substantially in the second direction;
    a data line which extends in the second direction;
    a high storage line which extends substantially in the second direction and overlaps the second stem of the high pixel electrode; and
    a low storage line which extends substantially in the second direction and overlaps the second stem of the low pixel electrode.

2. The display panel of claim 1, further comprising:
    a connecting electrode which electrically connects the high storage line to the low storage line.

3. The display panel of claim 2, wherein the connecting electrode comprises a material substantially the same as a material of the high and low pixel electrode.

4. The display panel of claim 1, wherein
    the high storage line comprises:
        a first high storage line which extends substantially in the first direction; and
        a second high storage line which extends substantially in the second direction and is connected to the first high storage line, and the low storage line comprises:
  a first low storage line which extends substantially in the first direction; and
  a second low storage line which extends substantially in the second direction, and is connected to the first low storage line.

5. The display panel of claim 4, wherein
the second high storage line is disposed between the data line and a data line of an adjacent pixel, and
the second low storage line is disposed between the data line and the data line of the adjacent pixel.

6. The display panel of claim 4, wherein
the first high storage line extends through adjacent pixels, and
the first low storage line extends through the adjacent pixels.

7. The display panel of claim 1, further comprising:
a gate line which extends substantially in the first direction and disposed between the high pixel electrode and the low pixel electrode.

8. The display panel of claim 1, further comprising:
a gate line which extends substantially in the first direction;
an adjacent gate line spaced apart from the gate line in the second direction, and which extends substantially in the first direction, wherein the gate line and the adjacent gate line receive a same gate signal;
a first switching element electrically connected to the gate line, the data line and the high pixel electrode;
a second switching element electrically connected to the gate line, the data line and the low pixel electrode; and
a third switching element electrically connected to the gate line, the second switching element and the high storage line.

9. The display panel of claim 8, wherein
the high pixel electrode further comprises a plurality of branches which extends from the first and second stems of the high pixel electrode, wherein the high pixel electrode has a slit structure defined by the branches,
the low pixel electrode further comprises a plurality of branches which extends from the first and second stems of the low pixel electrode, wherein the low pixel electrode has a slit structure defined by the branches.

10. The display panel of claim 9, wherein
the first high pixel electrode is divided into four domains by the first and second stems thereof, and
the low pixel electrode is divided into four domains by the first and second stems thereof.

* * * * *